US010871397B2

(12) United States Patent
Yokino et al.

(10) Patent No.: US 10,871,397 B2
(45) Date of Patent: Dec. 22, 2020

(54) SPECTROSCOPE

(71) Applicant: HAMAMATSU PHOTONICS K.K., Hamamatsu (JP)

(72) Inventors: Takafumi Yokino, Hamamatsu (JP); Katsumi Shibayama, Hamamatsu (JP); Katsuhiko Kato, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/709,015

(22) Filed: Dec. 10, 2019

(65) Prior Publication Data

US 2020/0109989 A1 Apr. 9, 2020

Related U.S. Application Data

(63) Continuation of application No. 16/292,861, filed on Mar. 5, 2019, now Pat. No. 10,539,461, which is a (Continued)

(30) Foreign Application Priority Data

Aug. 4, 2015 (JP) ................... 2015-153863

(51) Int. Cl.
*G01J 3/28* (2006.01)
*G01J 3/18* (2006.01)
(Continued)

(52) U.S. Cl.
CPC .................. *G01J 3/18* (2013.01); *G01J 3/021* (2013.01); *G01J 3/0205* (2013.01);
(Continued)

(58) Field of Classification Search
CPC ........ G01J 3/28; G01J 3/26; G01J 3/02; G01J 3/18; G01J 3/36; G02B 5/18
See application file for complete search history.

(56) References Cited

U.S. PATENT DOCUMENTS 6,606,156 B1 8/2003 Ehbets et al.
7,576,855 B2 8/2009 Tsukuda
(Continued)

FOREIGN PATENT DOCUMENTS

CN 101970995 A 2/2011
CN 102483351 A 5/2012
(Continued)

OTHER PUBLICATIONS

International Preliminary Report on Patentability dated Feb. 15, 2018 for PCT/JP2016/073015.

*Primary Examiner* — Abdullahi Nur
(74) *Attorney, Agent, or Firm* — Faegre Drinker Biddle & Reath LLP

(57) ABSTRACT

A spectrometer includes a support having a bottom wall part in which a depression including a concave curved inner surface and a peripheral part adjacent to the depression are provided, and a side wall part disposed on a side on which the depression is open with respect to the bottom wall part, a light detection element supported by the side wall part while opposing the depression, and a dispersive part disposed on the inner surface of the depression. A length of the depression in a second direction in which a plurality of grating grooves included in the dispersive part is aligned is larger than a length of the depression in a third direction orthogonal to the second direction when viewed in a first direction in which the depression and the light detection element oppose each other. An area of the peripheral part adjacent to the depression in the second direction is larger than an area of the peripheral part adjacent to the depression in the third direction when viewed in the first direction.

30 Claims, 13 Drawing Sheets

Related U.S. Application Data continuation of application No. 16/166,658, filed on Oct. 22, 2018, now Pat. No. 10,260,944, which is a continuation of application No. 15/749,205, filed as application No. PCT/JP2016/073015 on Aug. 4, 2016, now Pat. No. 10,132,683.

(51) Int. Cl.
    *G01J 3/36*     (2006.01)
    *G01J 3/02*     (2006.01)
    *G02B 5/18*     (2006.01)

(52) U.S. Cl.
    CPC ........... *G01J 3/0208* (2013.01); *G01J 3/0256* (2013.01); *G01J 3/0262* (2013.01); *G01J 3/0264* (2013.01); *G01J 3/0286* (2013.01); *G01J 3/0291* (2013.01); *G01J 3/36* (2013.01); *G02B 5/1861* (2013.01)

(56) References Cited

U.S. PATENT DOCUMENTS

| | | | |
|---|---|---|---|
| 8,390,806 | B1 | 3/2013 | Subramanian |
| 2006/0263872 | A1 | 11/2006 | Tsukuda |
| 2009/0262346 | A1* | 10/2009 | Egloff ....................... G01J 3/02 |
| | | | 356/326 |

FOREIGN PATENT DOCUMENTS

| | | |
|---|---|---|
| CN | 103017905 A | 4/2013 |
| CN | 103983354 A | 8/2014 |
| JP | 2009-210416 A | 9/2009 |
| JP | 2010-256670 A | 11/2010 |
| JP | 2010-286829 A | 12/2010 |
| JP | 2011-123057 A | 6/2011 |
| JP | 2012-173208 A | 9/2012 |
| JP | 2013-029327 A | 2/2013 |
| JP | 2014-032156 A | 2/2014 |
| WO | WO 00/40935 A1 | 7/2000 |

\* cited by examiner

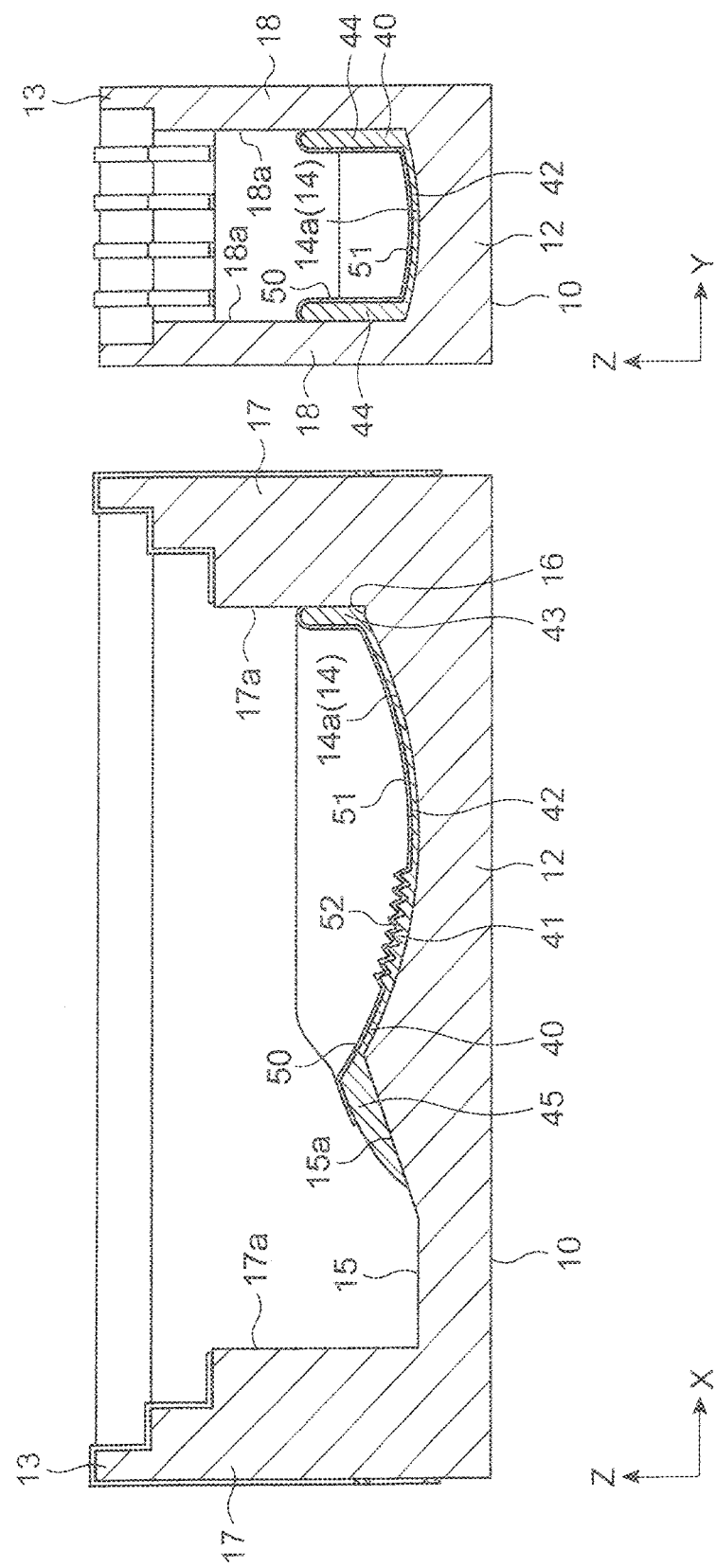

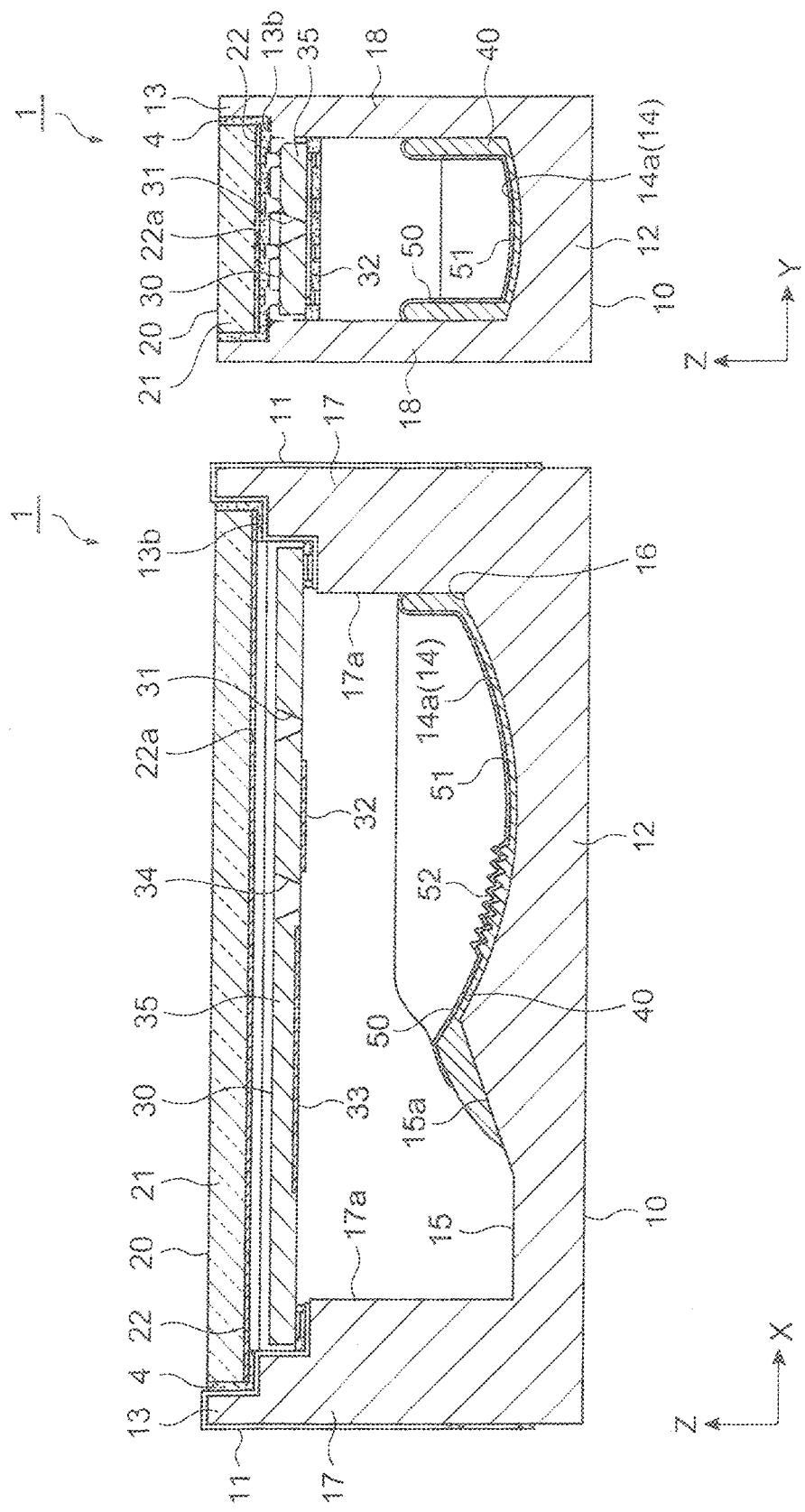

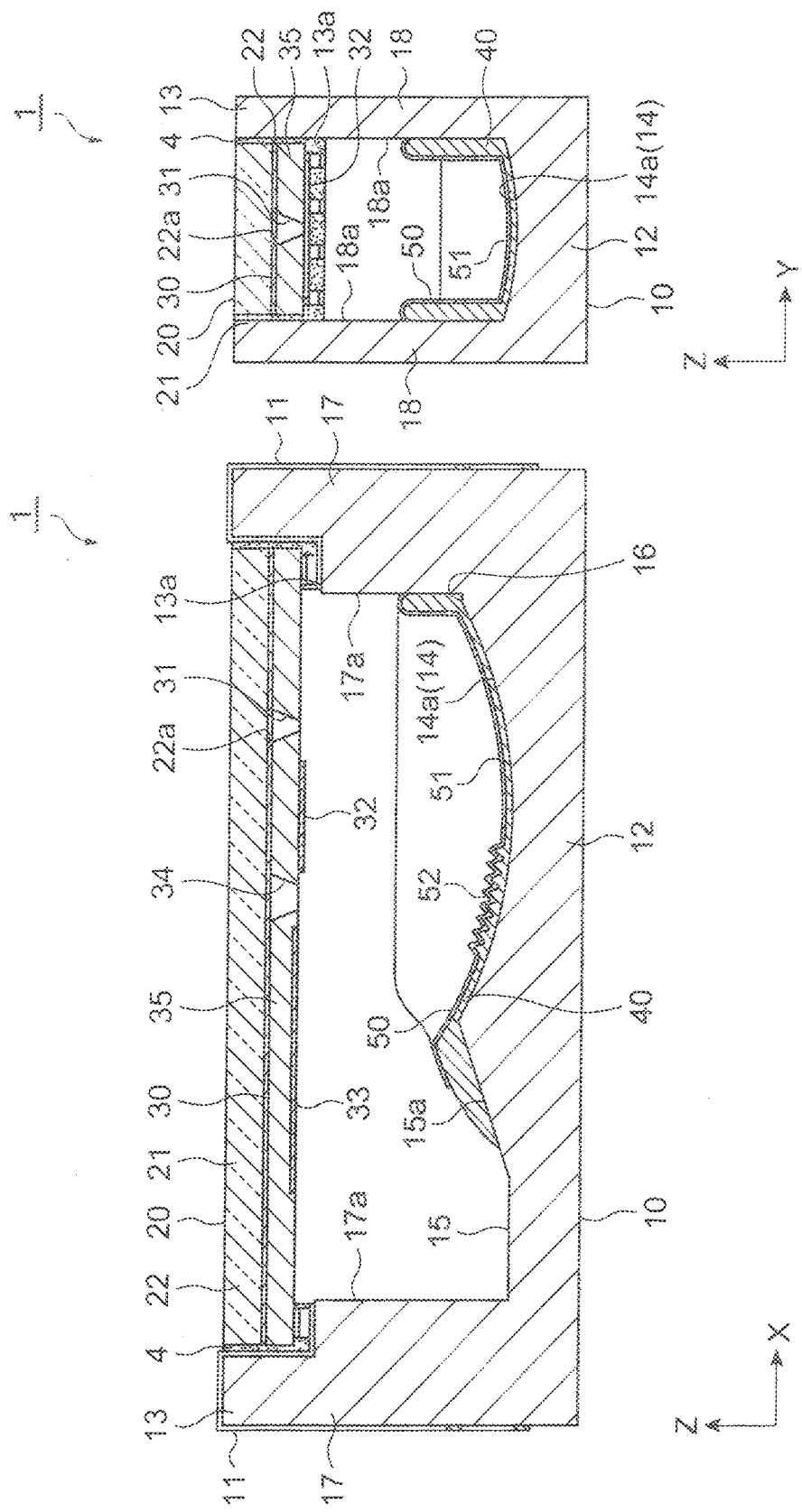

SPECTROSCOPE

TECHNICAL FIELD

The present disclosure relates to a spectrometer which disperses and detects light.

BACKGROUND ART

There has been a known spectrometer including a box-shaped support provided with a depression on the inside thereof, a light detection element attached to an opening of the support, a resin layer disposed to cover the depression of the support, and a dispersive part provided in the resin layer (for example, see Patent Literature 1).

CITATION LIST

Patent Literature

Patent Literature 1: Japanese Unexamined Patent Publication No. 2010-256670

SUMMARY OF INVENTION

Technical Problem

The above-described spectrometer requires further miniaturization, in particular, thinning in response to expansion of use. However, as the spectrometer is further thinned, an influence of stray light relatively increases, thereby increasing concern about a decrease in detection accuracy of the spectrometer.

It is therefore an object of an aspect of the disclosure to provide a spectrometer which can attempt thinning while suppressing a decrease in detection accuracy.

Solution to Problem

A spectrometer in accordance with one aspect of the disclosure includes a support having a bottom wall part in which a depression including a concave curved inner surface and a peripheral part adjacent to the depression are provided, and a side wall part disposed on a side on which the depression is open with respect to the bottom wall part, a light detection element supported by the side wall part while opposing the depression, and a dispersive part disposed on the inner surface of the depression, wherein a length of the depression in a second direction in which a plurality of grating grooves included in the dispersive part is aligned is larger than a length of the depression in a third direction orthogonal to the second direction when viewed in a first direction in which the depression and the light detection element oppose each other, and an area of the peripheral part adjacent to the depression in the second direction is larger than an area of the peripheral part adjacent to the depression in the third direction when viewed in the first direction.

In this spectrometer, the dispersive part is disposed on the inner surface of the depression provided on the bottom wall part of the support, and the light detection element is supported by the side wall part of the support while opposing the depression. According to such a configuration, it is possible to reduce the size of the spectrometer. In particular, since the length of the depression in the second direction in which the plurality of grating grooves included in the dispersive part is aligned is larger than the length of the depression in the third direction orthogonal to the second direction when viewed in the first direction in which the depression and the light detection element oppose each other, and the area of the peripheral part adjacent to the depression in the second direction is larger than the area of the peripheral part adjacent to the depression in the third direction, it is possible to thin the spectrometer in the third direction. In addition, even when light dispersed and reflected by the dispersive part is reflected by the light detection element, the light may be inhibited from becoming stray light by letting the light into the peripheral part adjacent to the depression in the second direction. Therefore, according to this spectrometer, it is possible to attempt thinning while suppressing a decrease in detection accuracy.

In a spectrometer in accordance with one aspect of the disclosure, the side wall part may have an annular shape enclosing the depression and the peripheral part when viewed in the first direction. In this way, it is possible to reliably suppress deterioration of a characteristic of the dispersive part.

In a spectrometer in accordance with one aspect of the disclosure, the peripheral part may include an inclined surface away from the light detection element as the inclined surface is away from the depression. In this way, even when light dispersed and reflected by the dispersive part is reflected by the light detection element, the light may be more reliably inhibited from becoming stray light by letting the light into the inclined surface of the peripheral part.

In a spectrometer in accordance with one aspect of the disclosure, the dispersive part may be offset so as to be disposed on one side in the second direction with respect to a center of the depression when viewed in the first direction, and an area of the peripheral pan located on one side of the depression in the second direction may be larger than an area of the peripheral part located on the other side of the depression in the second direction when viewed in the first direction. In this way, even when light dispersed and reflected by the dispersive part is reflected by the light detection element, the light may be more reliably inhibited from becoming stray light by letting the light into the peripheral part located on the one side of the depression in the second direction.

In a spectrometer in accordance with one aspect of the disclosure, a boundary line between the depression and the peripheral part adjacent to each other in the second direction may traverse the bottom wall part along the third direction when viewed in the first direction. In this way, it is possible to increase the quantity of light to be dispersed by increasing the length of the dispersive part in the third direction, thereby improving detection sensitivity.

In a spectrometer in accordance with one aspect of the disclosure, the inner surface of the depression may be curved in a shape of a curved surface in each of the second direction and the third direction. In this way, it is possible to accurately concentrate the light dispersed by the dispersive part on a predetermined position of the light detection element while attempting an increase in the quantity of light to be dispersed.

In a spectrometer in accordance with one aspect of the disclosure, the plurality of grating grooves may be curved in a curved line shape on the same side when viewed in the first direction. In this way, it is possible to accurately concentrate the light dispersed by the dispersive part on a predetermined position of the light detection element.

In a spectrometer in accordance with one aspect of the disclosure, shapes of the depression and the peripheral part may be formed by a shape of the support. In this way, the shapes of the depression and the peripheral part are accurately and stably demarcated, and thus it is possible to obtain the highly accurate dispersive part.

In a spectrometer in accordance with one aspect of the disclosure, the side wall part may have a pair of first side walls opposing each other with the depression and the peripheral part interposed therebetween in the second direction and a pair of second side walls opposing each other with the depression and the peripheral part interposed therebetween in the third direction when viewed in the first direction. In this way, it is possible to simplify a configuration of the support.

In a spectrometer in accordance with one aspect of the disclosure, inner surfaces of the pair of first side walls opposing each other may be inclined to be away from each other as the inner surfaces are away from the depression and the peripheral part and approach the light detection element. In this way, it is possible to inhibit stress from acting on the dispersive part by relatively increasing the thickness of the side wall part on the side of the depression in which the dispersive part is provided. In addition, it is possible to reduce the weight of the support by relatively decreasing the thickness of the side wall part on the light detection element side.

In a spectrometer in accordance with one aspect of the disclosure, inner surfaces of the pair of second side walls opposing each other may be inclined to be away from each other as the inner surfaces are away from the depression and the peripheral part and approach the light detection element. In this way, it is possible to inhibit stress from acting on the dispersive part by relatively increasing the thickness of the side wall part on the side of the depression in which the dispersive part is provided. In addition, it is possible to reduce the weight of the support by relatively decreasing the thickness of the side wall part on the light detection element side.

In a spectrometer in accordance with one aspect of the disclosure, the spectrometer may further include a first reflection part disposed on the inner surface of the depression, wherein a light passing part, a second reflection part, and a light detection part may be provided in the light detection element, the first reflection part may reflect light passing through the light passing part, the second reflection part may reflect light reflected by the first reflection part, the dispersive part may disperse and reflect light reflected by the second reflection part, and the light detection part may detect light dispersed and reflected by the dispersive part. Reflecting light passing through the light passing part by the first reflection part and the second reflection part in order facilitates adjustment of an incidence direction of the light entering the dispersive part and a diffusion or convergence state of the light. Thus, even when an optical path length from the dispersive part to the light detection part is shortened, the light dispersed by the dispersive part may be accurately concentrated on a predetermined position of the light detection part.

A spectrometer in accordance with one aspect of the disclosure includes a support having a bottom wall part and a side wall part disposed on one side of the bottom wall part, a dispersive part disposed on the one side of the bottom wall part, a light detection element disposed in a first widened part in which a space inside the support is widened on an opposite side from the bottom wall part in the side wall part, a cover disposed in a second widened part in which a space inside the first widened part is widened on the opposite side from the bottom wall part in the side wall part, and a wiring electrically connected to the light detection element, the wiring extending to an outer surface of the support through the first widened part and the second widened part, wherein a side surface of the first widened part is inclined to form an obtuse angle with a bottom surface of the first widened part, a side surface of the second widened part is inclined to form an obtuse angle with a bottom surface of the second widened part, and a region in which at least the wiring is disposed on an end surface of the support on an opposite side from the bottom wall part is located on a side of the bottom wall part with respect to a surface of the cover on an opposite side from the bottom wall part.

In this spectrometer, the side surface of the first widened part is inclined to form an obtuse angle with the bottom surface of the first widened part, the side surface of the second widened part is inclined to form an obtuse angle with the bottom surface of the second widened part. In this way, it is possible to easily and accurately draw the wiring. In addition, it is possible to reduce stress generated in the wiring. Further, in this spectrometer, the region in which at least the wiring is disposed on the end surface of the support on the opposite side from the bottom wall part is located on the side of the bottom wall part with respect to the surface of the cover on the opposite side from the bottom wall part. In this way, it is possible to prevent the wiring from coming into contact with another member at the time of mounting the spectrometer. In addition, it is possible to reduce the length of the wiring.

In a spectrometer in accordance with one aspect of the disclosure, one terminal of the light detection element and one end part of the wiring opposing each other in the first widened part may be connected to each other by a plurality of bumps, and the plurality of bumps may be aligned along a direction in which a plurality of grating grooves included in the dispersive part is aligned. In this way, for example, it is possible to inhibit a positional relationship between the plurality of grating grooves in the dispersive part and the plurality of light detection channels in the light detection part of the light detection element from varying due to thermal expansion of the support, etc. In addition, it is possible to sufficiently ensure the area of each terminal by two-dimensionally disposing the bumps when compared to a case in which the bumps are disposed in one row since there is room in available space.

In a spectrometer in accordance with one aspect of the disclosure, the cover and the light detection element may be away from each other. In this way, it is possible to more reliably remove stray light by a space between the cover and the light detection element.

In a spectrometer in accordance with one aspect of the disclosure, a coefficient of thermal expansion of the support in the direction in which the plurality of grating grooves included in the dispersive part is aligned may be smaller than a coefficient of thermal expansion of the support in a direction orthogonal to both the direction in which the plurality of grating grooves is aligned and a direction in which the dispersive part and the light detection element oppose each other. In this way, it is possible to inhibit a positional relationship between the plurality of grating grooves in the dispersive part and the plurality of light detection channels in the light detection part of the light detection element from varying due to thermal expansion of the support.

In a spectrometer in accordance with one aspect of the disclosure, a member made of resin may be filled between the side surface of the first widened part and the light detection element. In this way, it is possible to stably support the light detection element.

In a spectrometer in accordance with one aspect of the disclosure, a member made of resin may be filled between the side surface of the second widened part and the cover. In this way, it is possible to stably support the cover.

Advantageous Effects of Invention

According to an aspect of the disclosure, it is possible to provide a spectrometer which can attempt thinning while suppressing a decrease in detection accuracy.

BRIEF DESCRIPTION OF DRAWINGS

FIGS. 8A and 8B are cross-sectional views illustrating a process of the method for manufacturing the spectrometer of FIG. 1.

FIGS. 10A and 10B are cross-sectional views illustrating a process of the method for manufacturing the spectrometer of FIG. 1.

FIGS. 12A and 12B are cross-sectional views of a modified example of the spectrometer of FIG. 1.

DESCRIPTION OF EMBODIMENTS

Figure 1:
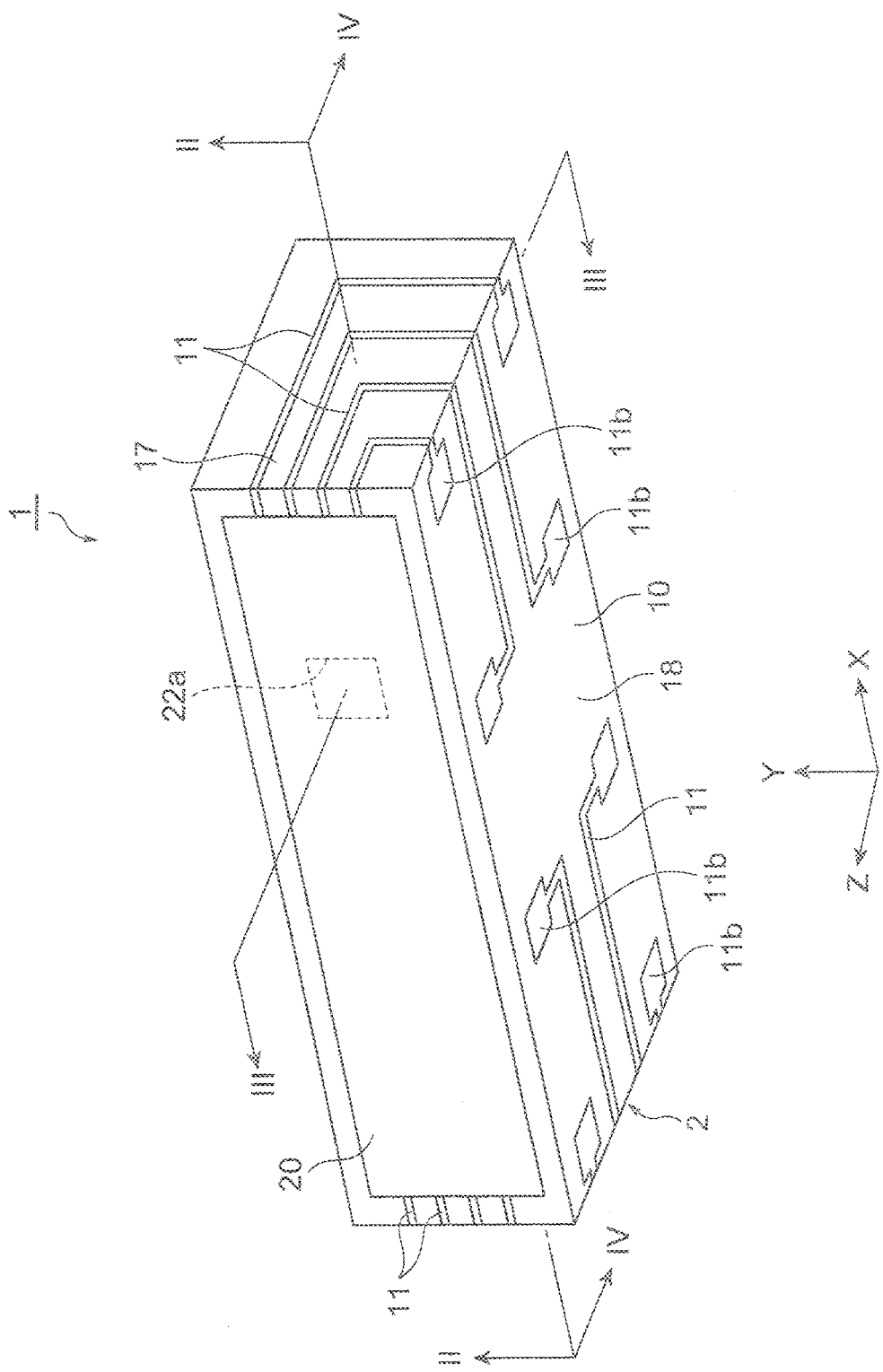
FIG. 1 is a perspective view of a spectrometer in accordance with an embodiment of the disclosure.

In the following, an embodiment of the disclosure will be explained in detail with reference to the drawings. In the drawings, the same or equivalent parts will be referred to with the same signs while omitting their overlapping descriptions.

(Configuration of Spectrometer)

As illustrated in FIG. 1, in a spectrometer 1, a box-shaped package 2 includes a support 10 and a cover 20. The support 10 is configured as a molded interconnect device (MID) and has a plurality of wirings 11. For example, the spectrometer 1 is formed in a shape of a rectangular parallelepiped, a length of which in each of an X-axis direction, a Y-axis direction (a direction orthogonal to the X-axis direction), and a Z-axis direction (a direction orthogonal to the X-axis direction and the Y-axis direction) is less than or equal to 15 mm. In particular, the spectrometer 1 is thinned to a length of about several mm in the Y-axis direction.

Figure 2:
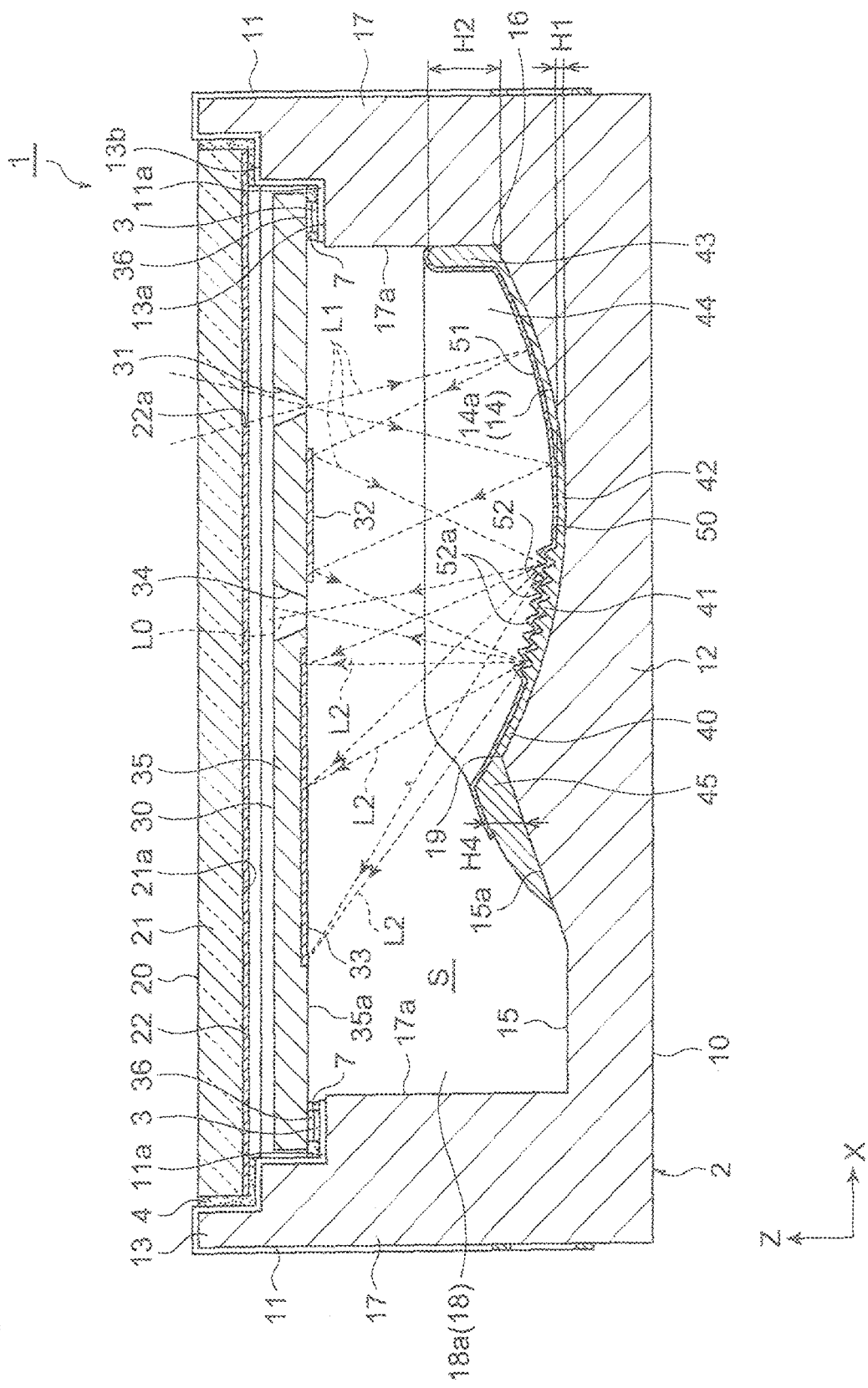
FIG. 2 is a cross-sectional view taken along II-II line of FIG. 1.
Figure 3:
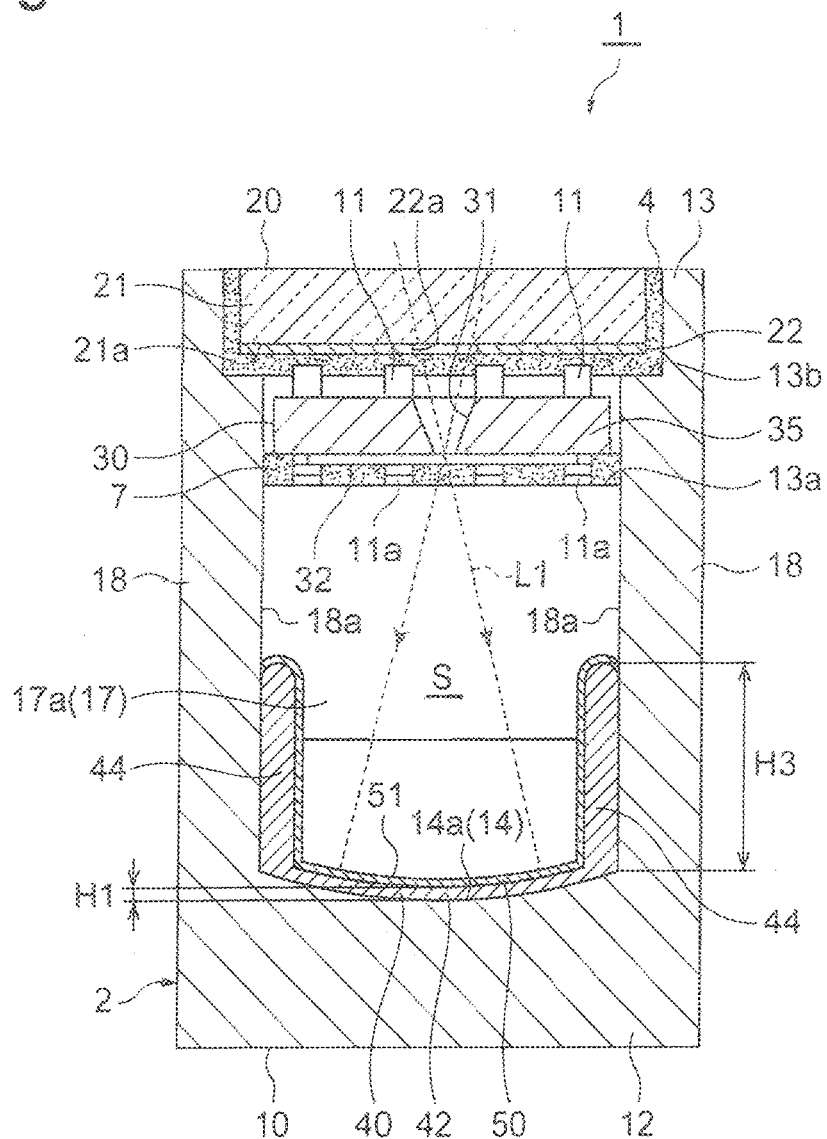
FIG. 3 is a cross-sectional view taken along III-III line of FIG. 1.

As illustrated in FIG. 2 and FIG. 3, a light detection element 30, a resin layer 40, and a reflecting layer 50 are provided in the package 2. A first reflection part 51 and a dispersive part 52 are provided in the reflecting layer 50. A light passing part 31, a second reflection part 32, a light detection part 33, and a zero-order light capture part 34 are provided in the light detection element 30. The light passing part 31, the first reflection part 51, the second reflection part 32, the dispersive part 52, the light detection part 33, and the zero-order light capture part 34 are aligned on the same straight line parallel to the X-axis direction when viewed in an optical axis direction of light L1 (that is, the Z-axis direction) passing through the light passing part 31.

In the spectrometer 1, the light L1, passing through the light passing part 31 is reflected by the first reflection part 51, and the light L1 reflected by the first reflection part 51 is reflected by the second reflection part 32. The light L1 reflected by the second reflection part 32 is dispersed and reflected by the dispersive part 52. In light dispersed and reflected by the dispersive part 52, light L2 other than zero-order light L0 directed to the light detection part 33 enters the light detection part 33 and is detected by the light detection part 33, and the zero-order light L0 enters the zero-order light capture part 34 and is captured by the zero-order light capture part 34. An optical path of the light L1 from the light passing part 31 to the dispersive part 52, an optical path of the light L2 from the dispersive part 52 to the light detection part 33, and an optical path of the zero-order light L0 from the dispersive part 52 to the zero-order light capture part 34 are formed in a space S inside the package 2.

The support 10 has a bottom wall part 12 and a side wall part 13. A depression 14 and peripheral parts 15 and 16 are provided on a surface of the bottom wall part 12 on the space S side. The side wall part 13 is disposed on a side on which the depression 14 is open with respect to the bottom wall part 12. The side wall part 13 has a rectangular annular shape that encloses the depression 14 and the peripheral parts 15 and 16 when viewed in the Z-axis direction. More specifically, the side wall part 13 has a pair of first side walls 17 and a pair of second side walls 18. The pair of first side walls 17 opposes each other with the depression 14 and the peripheral parts 15 and 16 interposed therebetween in the X-axis direction when viewed in the Z-axis direction. The pair of second side walls 18 opposes each other with the depression 14 and the peripheral parts 15 and 16 interposed therebetween in the Y-axis direction when viewed in the Z-axis direction. The bottom wall part 12 and the side wall part 13 are integrally formed by ceramic such as AlN, $Al_2O_3$, etc.

A first widened part 13a and a second widened part 13b are provided in the side wall part 13. The first widened part 13a is a stepped part in which the space S is widened only in the X-axis direction on the opposite side from the bottom wall part 12. The second widened part 13b is a stepped part in which the first widened part 13a is widened in each of the X-axis direction and the Y-axis direction on the opposite side from the bottom wall part 12. A first end part 11a of each of the wirings 11 is disposed in the first widened part 13a. Each of the wirings 11 reaches a second end part 11b disposed on an outer surface of one of the second side walls 18 through the second widened part 13b and outer surfaces of the first side walls 17 from the first end part 11a (see FIG. 1). Each second end part 11b functions as an electrode pad for mounting the spectrometer 1 on an external circuit board, and inputs/outputs an electric signal to/from the light detection part 33 of the light detection element 30 through each wiring 11.

Figure 4:
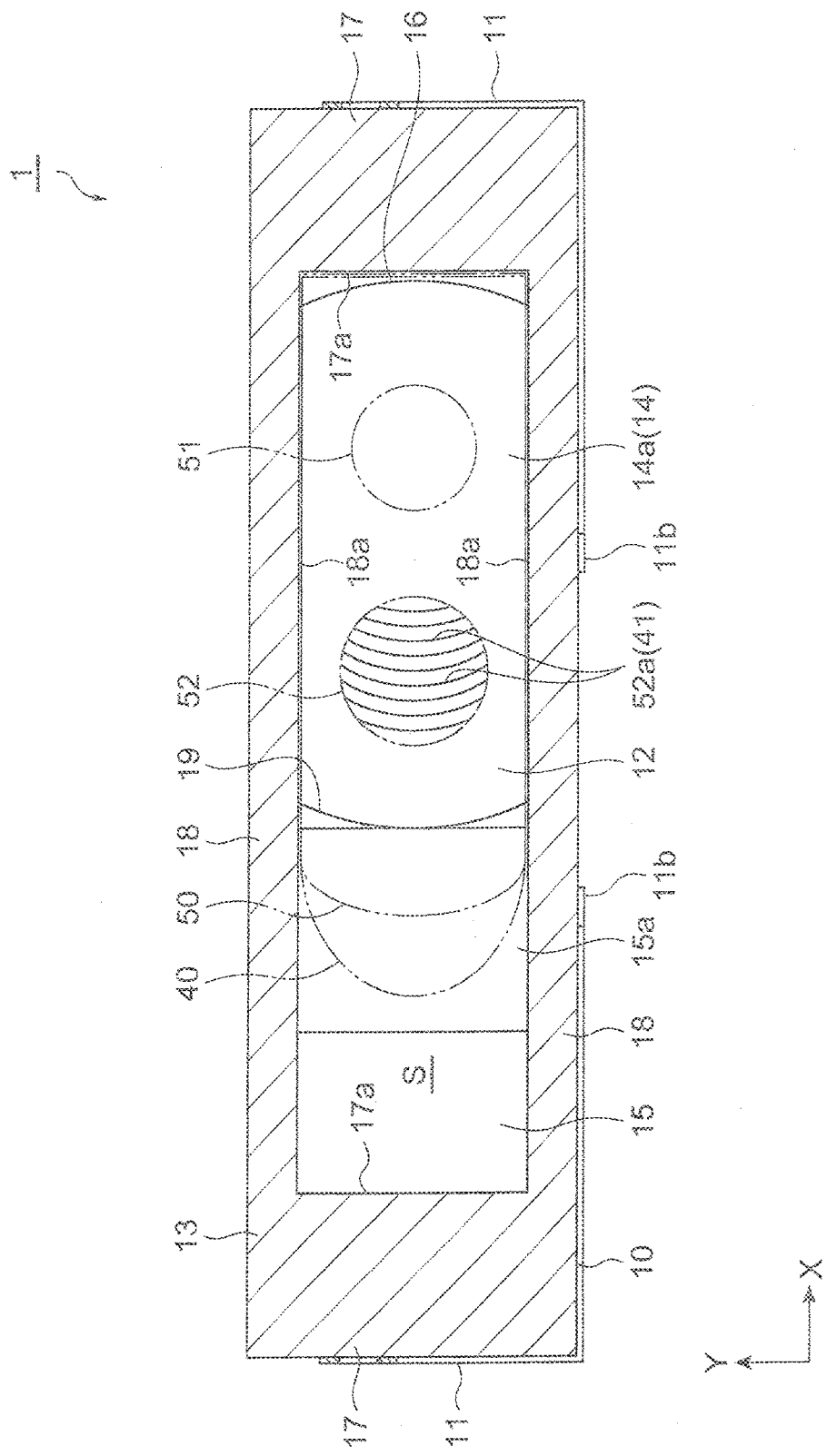
FIG. 4 is a cross-sectional view taken along IV-IV line of FIG. 1.

As illustrated in FIG. 2, FIG. 3, and FIG. 4, a length of the depression 14 in the X-axis direction is larger than a length of the depression 14 in the Y-axis direction when viewed in the Z-axis direction. The depression 14 includes a concave curved inner surface 14a. For example, the inner surface 14a has a shape in which both sides of a spherical surface (spherical crown) are cut off by a plane parallel to a ZX plane. In this way, the inner surface 14a is curved in a shape of a curved surface in each of the X-axis direction and the Y-axis direction. That is, the inner surface 14a is curved in a shape of a curved surface when viewed in the Y-axis direction (see FIG. 2) and when viewed in the X-axis direction (see FIG. 3).

Each of the peripheral parts 15 and 16 is adjacent to the depression 14 in the X-axis direction. The peripheral part 15 is located on one first side wall 17 side (one side in the X-axis direction) with respect to the depression 14 when viewed in the Z-axis direction. The peripheral part 16 is located on the other first side wall 17 side (the other side in the X-axis direction) with respect to the depression 14 when viewed in the Z-axis direction. An area of the peripheral part 15 is larger than an area of the peripheral part 16 when viewed in the Z-axis direction. In the spectrometer 1, the area of the peripheral part 16 is narrowed to the extent that an outer edge of the inner surface 14a of the depression 14 comes into contact with the inner surface 17a of the other first side wall 17 when viewed in the Z-axis direction. The peripheral part 15 includes an inclined surface 15a. The inclined surface 15a is inclined to be away from the light detection element 30 along the Z-axis direction as the inclined surface 15a is away from the depression 14 along the X-axis direction.

Shapes of the depression 14 and the peripheral parts 15 and 16 are formed by a shape of the support 10. That is, the depression 14 and the peripheral parts 15 and 16 are demarcated only by the support 10. The inner surface 14a of the depression 14 and an inner surface 17a of one first side wall 17 are connected to each other through the peripheral part 15 (that is, physically separated from each other). The inner surface 14a of the depression 14 and the inner surface 17a of the other first side wall 17 are connected to each other through the peripheral part 16 (that is, physically separated from each other). The inner surface 14a of the depression 14 and an inner surface 18a of each second side wall 18 are connected to each other through an intersecting line (a corner, a bending position, etc.) between a surface and a surface. In this way, the inner surface 14a of the depression 14 and the respective inner surfaces 17a and 18a of the side wall part 13 are connected to each other in a discontinuous state (a physically separated state, a state of being connected to each other through an intersecting line between a surface and a surface. A boundary line 19 between the depression 14 and the peripheral part 15 adjacent to each other in the X-axis direction when viewed in the Z-axis direction traverses the bottom wall part 12 along the Y-axis direction (see FIG. 4). That is, both ends of the boundary line 19 reach the inner surface 18a of each second side wall 18.

As illustrated in FIG. 2 and FIG. 3, the light detection element 30 includes a substrate 35. For example, the substrate 35 is formed in a rectangular plate shape using a semiconductor material such as silicone. The light passing part 31 is a slit formed in the substrate 35, and extends in the Y-axis direction. The zero-order light capture part 34 is a slit formed in the substrate 35, and is located between the light passing part 31 and the light detection part 33 when viewed in the Z-axis direction, and extends in the Y-axis direction. In the light passing part 31, an end part on an entrance side of the light L1 widens toward the entrance side of the light L1 in each of the X-axis direction and the Y-axis directions. In addition, in the zero-order light capture part 34, an end part on the opposite side from an entrance side of the zero-order light L0 widens toward the opposite side from the entrance side of the zero-order light L0 in each of the X-axis direction and the Y-axis directions. When the zero-order light L0 is configured to obliquely enter the zero-order light capture part 34, the zero-order light L0 entering the zero-order light capture part 34 may be more reliably inhibited from returning to the space S.

The second reflection part 32 is provided in a region between the light passing part 31 and the zero-order light capture part 34 on a surface 35a of the substrate 35 on the space S side. For example, the second reflection part 32 corresponds to a metal film of Al, Au, etc. and functions as a planar mirror.

The light detection part 33 is provided on the surface 35a of the substrate 35. More specifically, the light detection part 33 is put in the substrate 35 made of the semiconductor material rather than being attached to the substrate 35. That is, the light detection part 33 includes a plurality of photodiodes formed in a first conductivity type region inside the substrate 35 made of the semiconductor material and a second conductivity type region provided within the region. For example, the light detection part 33 is configured as a photodiode array, a C-MOS image sensor, a CCD image sensor, etc., and has a plurality of light detection channels arranged along the X-axis direction. Lights L2 having different wavelengths are let into the respective light detection channels of the light detection part 33. A plurality of terminals 36 for inputting/outputting electric signals to/from the light detection part 33 is provided on the surface 35a of the substrate 35. The light detection part 33 may be configured as a surface-incident photodiode or a back surface-incident photodiode. When the light detection part 33 is configured as the back surface-incident photodiode, the plurality of terminals 36 is provided on a surface of the substrate 35 on the opposite side from the surface 35a. Thus, in this case, each of the terminals 36 is electrically connected to a first end part 11a of a corresponding wiring 11 by wire bonding.

The light detection element 30 is disposed in the first widened part 13a of the side wall part 13. A terminal 36 of the light detection element 30 and the first end part 11a of the wiring 11 opposing each other in the first widened part 13a are connected to each other by a solder layer 3. For example, the terminal 36 of the light detection element 30 and the first end part 11a of the wiring 11 opposing each other are connected to each other by the solder layer 3 formed on a surface of the terminal 36 through a plating layer of a base (Ni—Au, Ni—Pd—Au, etc.). In this case, in the spectrometer 1, the light detection element 30 and the side wall part 13 are fixed to each other by the solder layer 3, and the light detection part 33 of the light detection element 30 and the plurality of wirings 11 are electrically connected to each other. For example, a reinforcing member 7 made of resin is disposed to cover a connection part between the terminal 36 of the light detection element 30 and the first end part 11a of the wiring 11 opposing each other between the light detection element 30 and the first widened part 13a. In this way, the light detection element 30 is attached to the side wall part 13 and supported by the side wall part 13 while opposing the depression 14. In the spectrometer 1, the Z-axis direction corresponds to a first direction in which the depression 14 and the light detection element 30 oppose each other.

The resin layer 40 is disposed on the inner surface 14a of the depression 14. The resin layer 40 is formed by pressing a mold die against a resin material corresponding to a molding material (e.g., photocuring epoxy resins, acrylic resins, fluorine-based resins, silicone, and replica optical resins such as organic/inorganic hybrid resins) and curing the resin material (by photocuring using UV light or thermal curing, etc.) in this state.

A grating pattern 41 is provided in a region of the resin layer 40 offset so as to be disposed on the peripheral part 15 side (one side in the X-axis direction) with respect to a center of the depression 14 when viewed in the Z-axis direction. For example, the grating pattern 41 corresponds to a blazed grating having a serrated cross section, a binary grating having a rectangular cross section, a holographic grating having a sinusoidal cross section, etc.

The resin layer 40 is away from the inner surface 17a of the one first side wall 17 (the first side wall 17 on the left side in FIG. 2) and comes into contact with each of the inner surface 17a of the other first side wall 17 (the first side wall 17 on the right side in FIG. 2), an inner surface 18a of one second side wall 18, and an inner surface 18a of the other second side wall 18. The resin layer 40 widens along each of the inner surface 17a of the other first side wall 17, the inner surface 18a of the one second side wall 18, and the inner surface 18a of the other second side wall 18 to climb up the inner surfaces 17a and 18a from the inner surface 14a.

A thickness of the resin layer 40 in the Z-axis direction is larger in a part 43 in contact with the inner surface 17a and a part 44 in contact with the inner surface 18a than in a part 42 disposed on the inner surface 14a. That is, a "thickness H2 along the Z-axis direction" of the part 43 in the resin layer 40 in contact with the inner surface 17a and a "thickness H3 along the Z-axis direction" of the part 44 in the resin layer 40 in contact with the inner surface 18a are larger than a "thickness H1 along the Z-axis direction" of the part 42 in the resin layer 40 disposed on the inner surface 14a. For example, H1 is about several μ to 80 μm (a minimum value is greater than or equal to a thickness enough to fill surface roughness of the support 10), and each of H2 and H3 is about several hundred μm.

The resin layer 40 reaches the inclined surface 15a of the peripheral part 15. The thickness of the resin layer 40 in the Z-axis direction is larger in a part 45 reaching the peripheral part 15 than in the part 42 disposed on the inner surface 14a. That is, a "thickness H4 along the Z-axis direction" of the part 45 in the resin layer 40 reaching the peripheral part 15 is larger than the "thickness H1 along the Z-axis direction" of the part 42 in the resin layer 40 disposed on the inner surface 14a. For example, H4 is about several hundred pin.

Here, when the "thicknesses along the Z-axis direction" in the respective parts 42, 43, 44, and 45 change, an average value of the thicknesses in the respective parts 42, 43, 44, and 45 may be regarded as the "thicknesses along the Z-axis direction" of the respective parts 42, 43, 44, and 45. A "thickness along a direction orthogonal to the inner surface 17a" of the part 43 in contact with the inner surface 17a, a "thickness along a direction orthogonal to the inner surface 18a" of the part 44 in contact with the inner surface 18a, and a "thickness along a direction orthogonal to the inclined surface 15a" of the part 45 reaching the peripheral part 15 are larger than the "thickness H1 along a direction orthogonal to the inner surface 14a" of the part 42 disposed on the inner surface 14a. The resin layer 40 described above is formed in a continuous state.

The reflecting layer 50 is disposed on the resin layer 40. For example, the reflecting layer 50 corresponds to a metal film of Al, Au, etc. A region of the reflecting layer 50 opposing the light passing part 31 of the light detection element 30 in the Z-axis direction corresponds to the first reflection part 51 functioning as a concave mirror. The first reflection part 51 is disposed on the inner surface 14a of the depression 14, and is offset so as to be disposed on the peripheral part 16 side (the other side in the X-axis direction) with respect to the center of the depression 14 when viewed in the Z-axis direction. A region of the reflecting layer 50 covering the grating pattern 41 of the resin layer 40 corresponds to the dispersive part 52 functioning as a reflection grating. The dispersive part 52 is disposed on the inner surface 14a of the depression 14, and is offset so as to be disposed on the peripheral part 15 side (the one side in the X-axis direction) with respect to the center of the depression 14 when viewed in the Z-axis direction. In this way, the first reflection part 51 and the dispersive part 52 are provided in the resin layer 40 on the inner surface 14a of the depression 14.

A plurality of grating grooves 52a included in the dispersive part 52 has a shape conforming to a shape of the grating pattern 41. The plurality of grating grooves 52a is aligned in the X-axis direction when viewed in the Z-axis direction, and is curved in a curved line shape (for example, an arc shape convex to the peripheral part 15 side) on the same side when viewed in the Z-axis direction (see FIG. 4). In the spectrometer 1, the X-axis direction corresponds to a second direction in which the plurality of grating grooves 52a is aligned when viewed in the Z-axis direction, and the Y-axis direction is a third direction orthogonal to the second direction when viewed in the Z-axis direction.

The reflecting layer 50 covers the whole part 42 (including the grating pattern 41) disposed on the inner surface 14a of the depression 14, the whole part 43 in contact with the inner surface 17a of the other first side wall 17, the whole part 44 in contact with the inner surface 18a of each second side wall 18, and a portion of the part 45 reaching the peripheral part 15 in the resin layer 40. That is, the reflecting layer 50 included in the first reflection part 51 and the dispersive part 52 is disposed on the resin layer 40 in a continuous state.

The cover 20 has a light transmitting member 21 and a light shielding film 22. For example, the light transmitting member 21 is formed in a rectangular plate shape using a material which transmits the light L1 therethrough, examples of which include silica, borosilicate glass (BK7), Pyrex (registered trademark) glass, and Kovar glass. The light shielding film 22 is formed on a surface 21a of the light transmitting member 21 on the space S side. A light transmitting opening 22a is formed in the light shielding film 22 to oppose the light passing part 31 of the light detection element 30 in the Z-axis direction. The light transmitting opening 22a is a slit formed in the light shielding film 22, and extends in the Y-axis direction.

When an infrared ray is detected, silicon, germanium, etc. is effective as a material of the light transmitting member 21. In addition, the light transmitting member 21 may be provided with an AR (Anti Reflection) coat, and may have such a filter function as to transmit therethrough only a predetermined wavelength of light. Further, for example, a black resist, Al, etc. may be used as a material of the light shielding film 22. Here, the black resist is effective as the material of the light shielding film 22 from a viewpoint that the zero-order light L0 entering the zero-order light capture part 34 is inhibited from returning to the space S. For example, the light shielding film 22 may correspond to a composite film including an Al layer covering the surface 21a of the light transmitting member 21 and a black resist layer provided at least in a region of the Al layer opposing the zero-order light capture part 34. That is, in the composite film, the Al layer and the black resist layer are stacked in this order on the space S side of the light transmitting member 21.

The cover 20 is disposed in the second widened part 13b of the side wall part 13. For example, a sealing member 4 made of resin, solder, etc. is disposed between the cover 20 and the second widened part 13b. In the spectrometer 1, the cover 20 and the side wall part 13 are fixed to each other by the sealing member 4, and the space S is airtightly sealed.

Action and Effect

According to the spectrometer 1, it is possible to attempt thinning while suppressing a decrease in detection accuracy for the following reasons.

First, the dispersive part 52 is disposed on the inner surface 14a of the depression 14 provided in the bottom wall part 12 of the support 10, and the light detection element 30 is supported by the side wall part 13 of the support 10 while opposing the depression 14. According to such a configuration, it is possible to reduce the size of the spectrometer 1. In particular, in the spectrometer 1, when viewed in the Z-axis direction, the length of the depression 14 in the X-axis direction is larger than the length of the depression 14 in the Y-axis direction, and the peripheral part is not provided on the one second side wall 18 side and the other second side wall 18 side with respect to the depression 14. In this way, the spectrometer 1 may be thinned in the Y-axis direction.

In addition, even when light dispersed and reflected by the dispersive part 52 is reflected by the light detection element 30, the light may be inhibited from becoming stray light by, for example, letting the light into the peripheral part 15 having a sufficient area compared to the peripheral part 16. In particular, in the spectrometer 1, since the peripheral part 15 includes the inclined surface 15a which is away from the light detection element 30 as the inclined surface 15a is away from the depression 14, it is possible to inhibit light reflected by the inclined surface 15a from directly returning to the light detection part 33 of the light detection element 30.

As described above, according to the spectrometer 1, it is possible to attempt thinning while suppressing a decrease in detection accuracy. In particular, in the spectrometer 1, the side wall part 13 has an annular shape that encloses the depression 14 and the peripheral parts 15 and 16 when viewed in the Z-axis direction. In this way, it is possible to reliably suppress deterioration of a characteristic of the dispersive part 52. In addition, in the spectrometer 1, the light L1 passing through the light passing part 31 is reflected by the first reflection part 51 and the second reflection part 32 in order and enters the dispersive part 52, which facilitates adjustment of an incidence direction of the light L1 entering the dispersive part 52 and a diffusion or convergence state of the light L1. Thus, even when an optical path length from the dispersive part 52 to the light detection part 33 is shortened, the light L2 dispersed by the dispersive part 52 may be accurately concentrated on a predetermined position of the light detection part 33.

In addition, in the spectrometer 1, the first reflection part 51 and the dispersive part 52 are provided on the depression 14 whose length in the X-axis direction is larger than the length in the Y-axis direction so as to lie along the X-axis direction. In this way, it is possible to improve detection sensitivity by increasing an effective area of the dispersive part 52 while thinning the spectrometer 1 in the Y-axis direction. Further, even when light dispersed and reflected by the dispersive part 52 is reflected by the light detection element 30 and returns to the depression 14, the light may be released to the opposite side from the light detection part 33.

In addition, in the spectrometer 1, the dispersive part 52 is offset so as to be disposed on one side in the X-axis direction with respect to the center of the depression 14 when viewed in the Z-axis direction. Further, when viewed in the Z-axis direction, the area of the peripheral part 15 located on one side of the depression 14 in the X-axis direction is larger than the area of the peripheral part 16 located on the other side of the depression 14 in the X-axis direction. In this way, even when light dispersed and reflected by the dispersive part 52 is reflected by the light detection element 30, the light may be more reliably inhibited from becoming stray light by letting the light into the peripheral part 15 located on one side of the depression 14 in the X-axis direction.

In addition, in the spectrometer 1, when viewed in the Z-axis direction, the boundary line 19 between the depression 14 and the peripheral part 15 adjacent to each other in the X-axis direction traverses the bottom wall part 12 along the Y-axis direction. In this way, it is possible to increase the quantity of light to be dispersed by increasing the length of the dispersive part 52 in the Y-axis direction, thereby improving the detection sensitivity.

In addition, in the spectrometer 1, the first reflection part 51 and the dispersive part 52 are disposed on the inner surface 14a of the one depression 14. When the first reflection part 51 and the dispersive part 52 are provided in separate depressions, respectively, an optical path is obstructed by a projection formed between the depression and the depression, so that a degree of freedom of optical path design decreases. As a result, there is concern that miniaturization of the spectrometer 1 may be hampered. On the other hand, in the spectrometer 1, since the first reflection part 51 and the dispersive part 52 are provided in one depression 14, a degree of freedom of optical path design is improved. As a result, miniaturization of the spectrometer 1 is allowed.

In addition, in the spectrometer 1, the inner surface 14a of the depression 14 is curved in a shape of a curved surface in each of the X-axis direction and the Y-axis direction. In this way, it is possible to accurately concentrate the light dispersed by the dispersive part 52 on a predetermined position of the light detection element 30 while attempting an increase in the quantity of light to be dispersed.

In addition, in the spectrometer 1, when viewed in the Z-axis direction, the plurality of grating grooves 52a is curved in a curved line shape on the same side. In this way, it is possible to accurately concentrate the light dispersed by the dispersive part 52 on a predetermined position of the light detection element 30.

In addition, in the spectrometer 1, the shapes of the depression 14 and the peripheral parts 15 and 16 are formed by the shape of the support 10. In this way, the shapes of the depression 14 and the peripheral parts 15 and 16 are accurately and stably demarcated, and thus it is possible to obtain the highly accurate dispersive part 52.

In addition, in the spectrometer 1, the first reflection part 51 and the dispersive part 52 are provided in the resin layer 40. In this way, the area in which the resin layer 40 covers the surface of the support 10 increases, and thus it is possible to suppress generation of stray light caused by scattering of light on the surface of the support 10. When the surface of the support 10 is covered with the resin layer 40, it is possible to easily and accurately obtain a surface capable of suppressing scattering of light without being influenced by a state of the shape of the support 10.

For example, a material of the support 10 may correspond to ceramic from viewpoints that it is possible to suppress expansion and contraction of the support 10 resulting from a temperature change of an environment in which the spectrometer 1 is used, generation of heat in the light detection part 33, etc. and it is possible to suppress a decrease in detection accuracy (a shift of peak wavelength in light detected by the light detection part 33, etc.) resulting from occurrence of a variance in a positional relationship between the dispersive part 52 and the light detection part 33. In addition, the material of the support 10 may correspond to plastic (PPA, PPS, LCP, PEAK, etc.) from a viewpoint that it is possible to facilitate molding of the support 10 and reduce the weight of the support 10. However, regardless of the material used for the support 10, the surface roughness of the support 10 is likely to be large when the support 10 having a certain thickness and size is to be produced. In particular, when the material of the support 10 corresponds to ceramic, the surface roughness of the support 10 is likely to be large. In addition, even when the material of the support 10 corresponds to plastic, the surface roughness of the support 10 is likely to be relatively large (for example, about 40 to 50 μm) (in the small-sized spectrometer 1 in which the depth of the grating groove 52*a* is 5 μm or less, the surface roughness of about 40 to 50 μm may be regarded as relatively large). Therefore, regardless of a material used as the material of the support 10, it is possible to easily and accurately obtain a surface which is smoother than the surface of the support 10 and can suppress scattering of light (the surface of the resin layer 40 having smaller surface roughness than the surface roughness of the support 10) by covering the surface of the support 10 with the resin layer 40.

In addition, in the spectrometer 1, the reflecting layer 50 in which the first reflection part 51 and the dispersive part 52 are formed is disposed in a continuous state on the resin layer 40. In this way, the area in which the reflecting layer 50 covers the surface of the resin layer 40 increases, and thus it is possible to suppress generation of stray light resulting from scattering of light on the surface of the resin layer 40. In addition, when light dispersed and reflected by the dispersive part 52 is reflected by the light detection element 30, the light is reflected by the reflecting layer 50 in the continuous state to the light passing part 31 side, and thus it is possible to inhibit the light from directly returning to the light detection part 33. In this case, it is difficult to define NA of the light L1 by the first reflection part 51. However, in the spectrometer 1, it is possible to define NA of the light L1 entering the space S by the light transmitting opening 22*a* of the light shielding film 22 and the light passing part 31 of the light detection element 30, and to define NA of the light L1 reflected by the first reflection part 51 by the second reflection part 32 of the light detection element 30.

In addition, in the spectrometer 1, the support 10 includes the bottom wall part 12 and the side wall part 13, and the side wall part 13 includes the pair of first side walls 17 and the pair of second side walls 18. In this way, the configuration of the support may be simplified.

In addition, in the spectrometer 1, the zero-order light capture part 34, which captures the zero-order light L0 in light dispersed and reflected by the dispersive part 52, is provided in the light detection element 30. In this way, it is possible to inhibit the zero-order light L0 from becoming stray light due to multiple reflections, etc. and detection accuracy from decreasing.

In addition, in the spectrometer 1, the package 2 includes the support 10 and the cover 20, and the space S in the package 2 is airtightly sealed. In this way, it is possible to suppress a decrease in detection accuracy resulting from deterioration of a member in the space S due to moisture, occurrence of condensation in the space S due to a decrease in ambient temperature, etc.

(Method for Manufacturing Spectrometer)

Figures 5A, 5B:
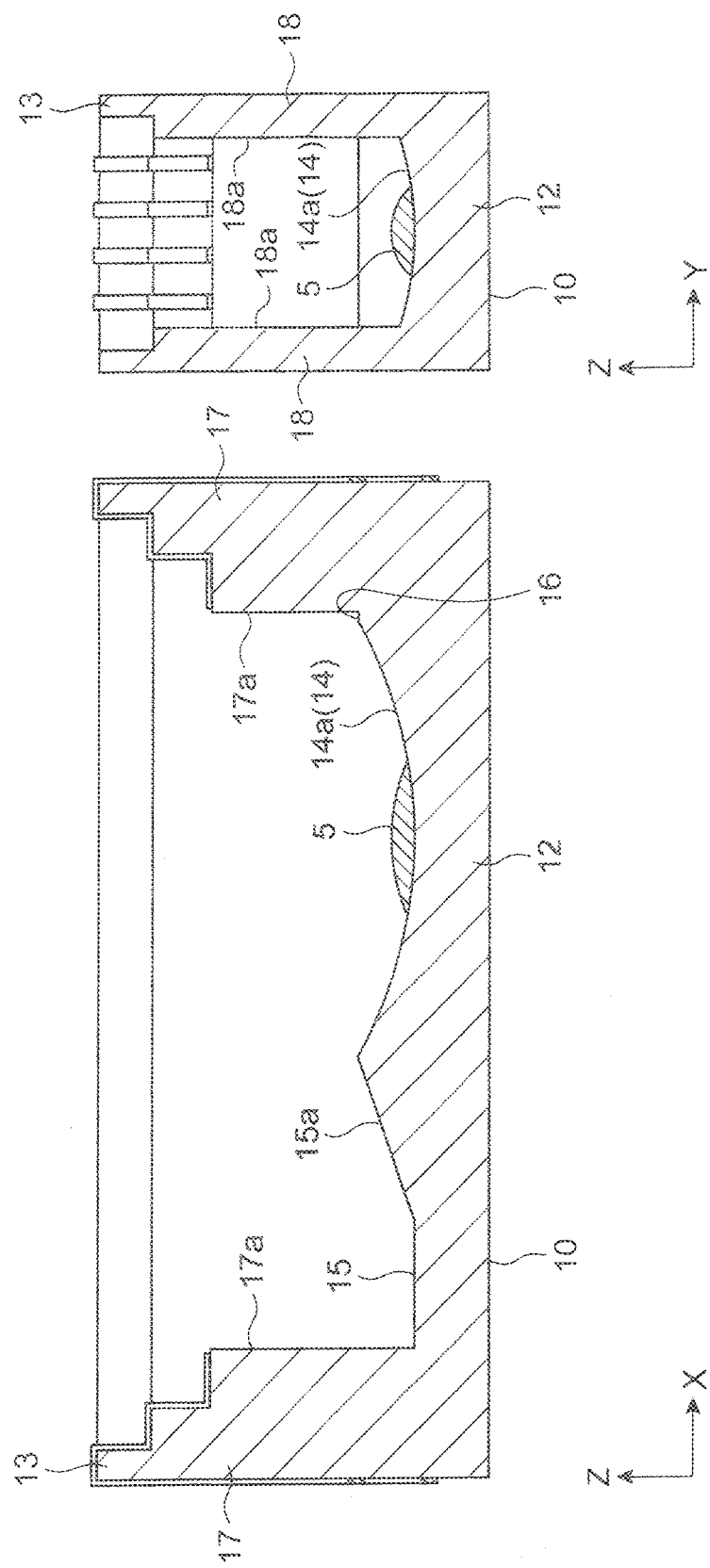
FIGS. 5A and 5B are cross-sectional views illustrating a process of a method for manufacturing the spectrometer of FIG. 1.

A description will be given of a method for manufacturing the above-described spectrometer 1. First, as illustrated in FIGS. 5A and 5B, the support 10 is prepared, and a resin material 5 corresponding to a molding material (for example, photocuring epoxy resins, acrylic resins, fluorine-based resins, silicone, and replica optical resins such as organic/inorganic hybrid resins) is disposed on the inner surface 14*a* of the depression 14 (first step).

Figures 6A, 6B:
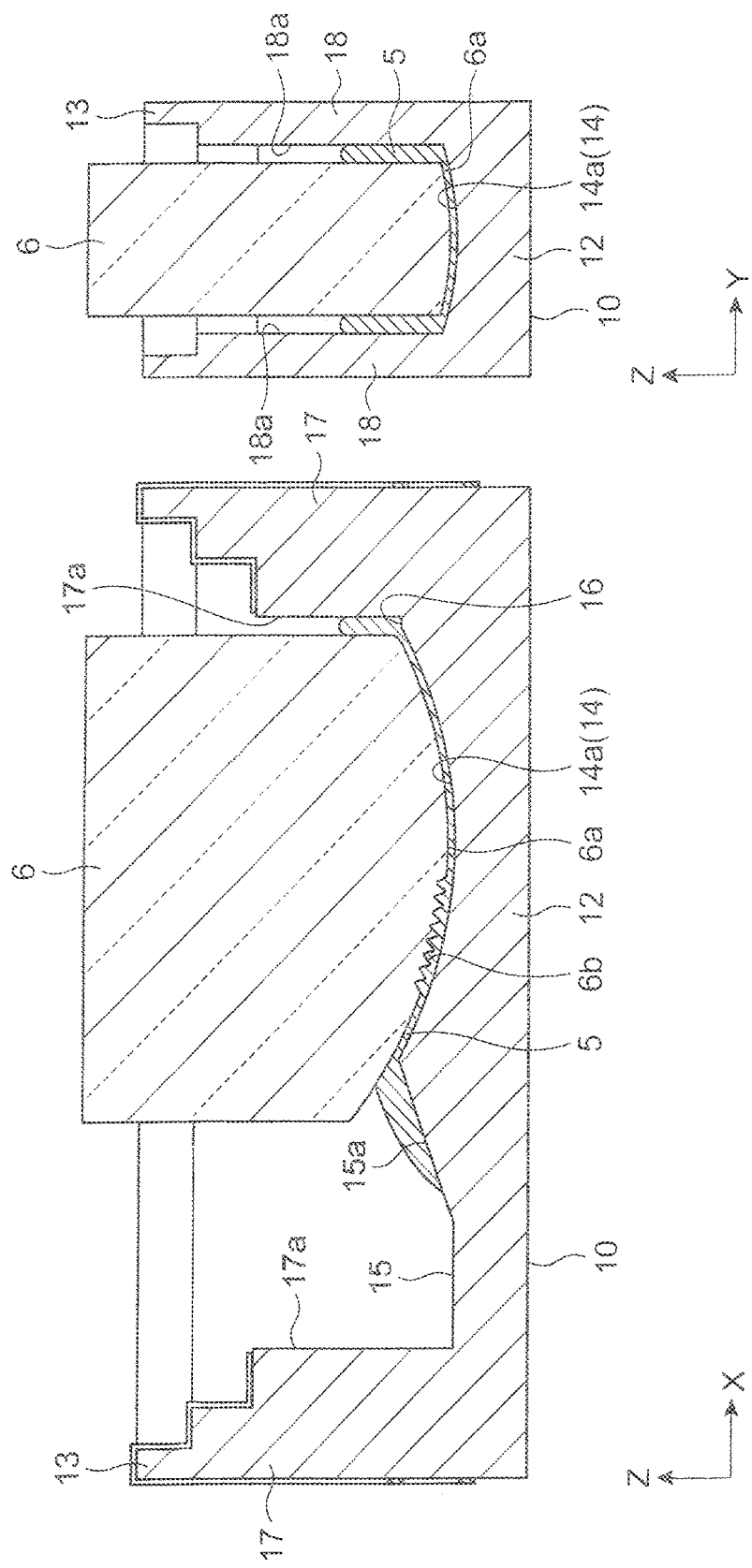
FIGS. 6A and 6B are cross-sectional views illustrating a process of the method for manufacturing the spectrometer of FIG. 1.
Figures 7A, 7B:
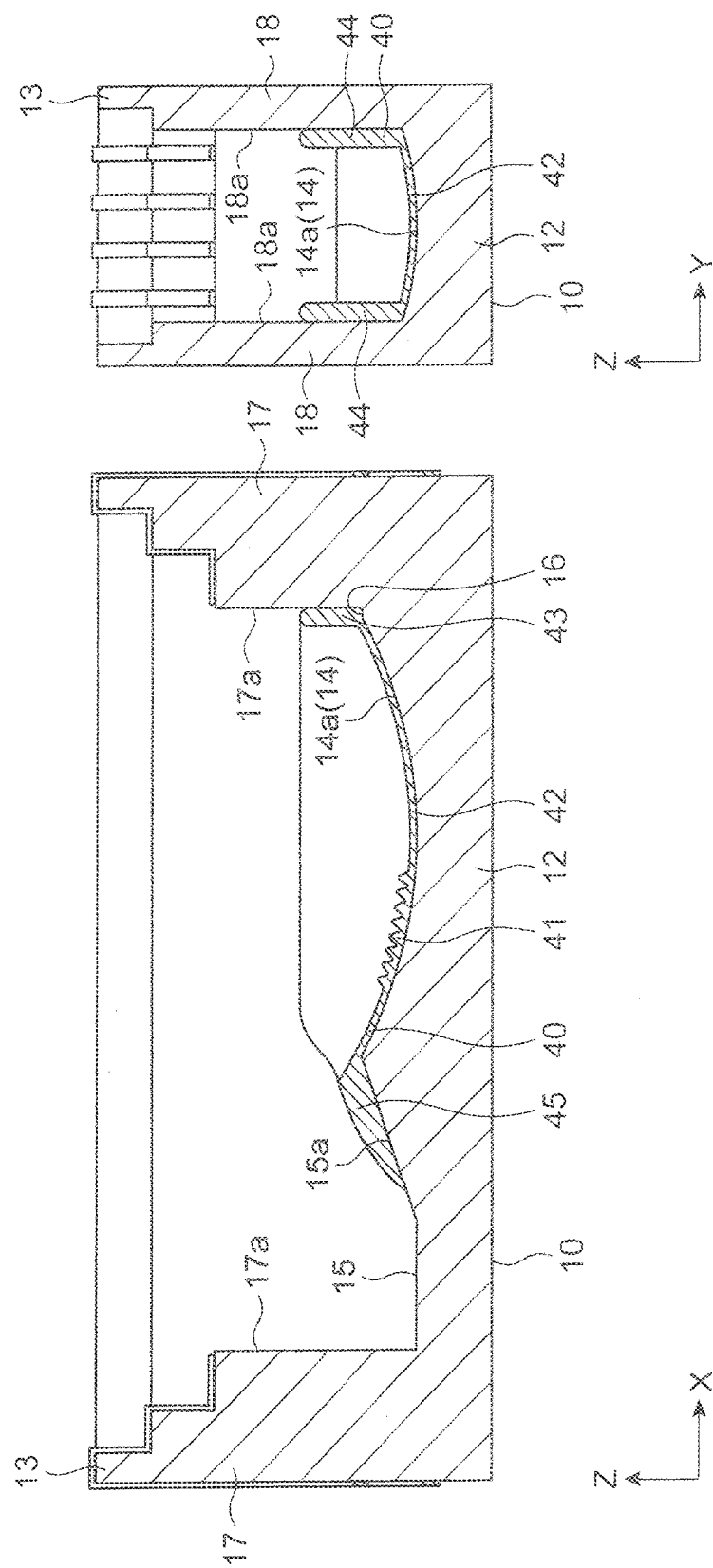
FIGS. 7A and 7B are cross-sectional views illustrating a process of the method for manufacturing the spectrometer of FIG. 1.

Subsequently, a mold die 6 is pressed against the resin material 5, and the resin material 5 is cured (for example, by photocuring using UV light or thermal curing, etc.) in this state as illustrated in FIGS. 6A and 6B, thereby forming the resin layer 40 on the inner surface 14*a* of the depression 14 as illustrated in FIGS. 7A and 7B (second step). As illustrated in FIGS. 6A and 6B, a molding surface 6*a* corresponding to the inner surface 14*a* of the depression 14 is provided on the mold die 6, and a pattern 6*b* corresponding to the grating pattern 41 is provided on the molding surface 6*a*. The molding surface 6*a* has smoothness close to that of a mirror surface.

In this instance, the resin layer 40 having the grating pattern 41 is formed to come into contact with each of the inner surface 17*a* of the other first side wall 17, the inner surface 18*a* of the one second side wall 18, and the inner surface 18*a* of the other second side wall 18. The resin layer 40 having the grating pattern 41 is formed such that the "thickness H2 along the Z-axis direction" of the part 43 in contact with the inner surface 17*a* and the "thickness H3 along the Z-axis direction" of the part 44 in contact with the inner surface 18*a* are larger than the "thickness H1 along the Z-axis direction" of the part 42 disposed on the inner surface 14*a*.

When the mold die 6 is pressed against the resin material 5, the peripheral part 15 serves as a shelter for surplus resin. In this way, it is possible to obtain the thin and highly accurate grating pattern 41.

Subsequently, as illustrated in FIGS. 8A and B, the first reflection part 51 and the dispersive part 52 are formed by forming the reflecting layer 50 on the resin layer 40 (third step). For example, the reflecting layer 50 is formed by evaporating metal such as Al, Au, etc. The reflecting layer 50 may be formed by another method other than evaporation of metal.

Figures 9A, 9B:
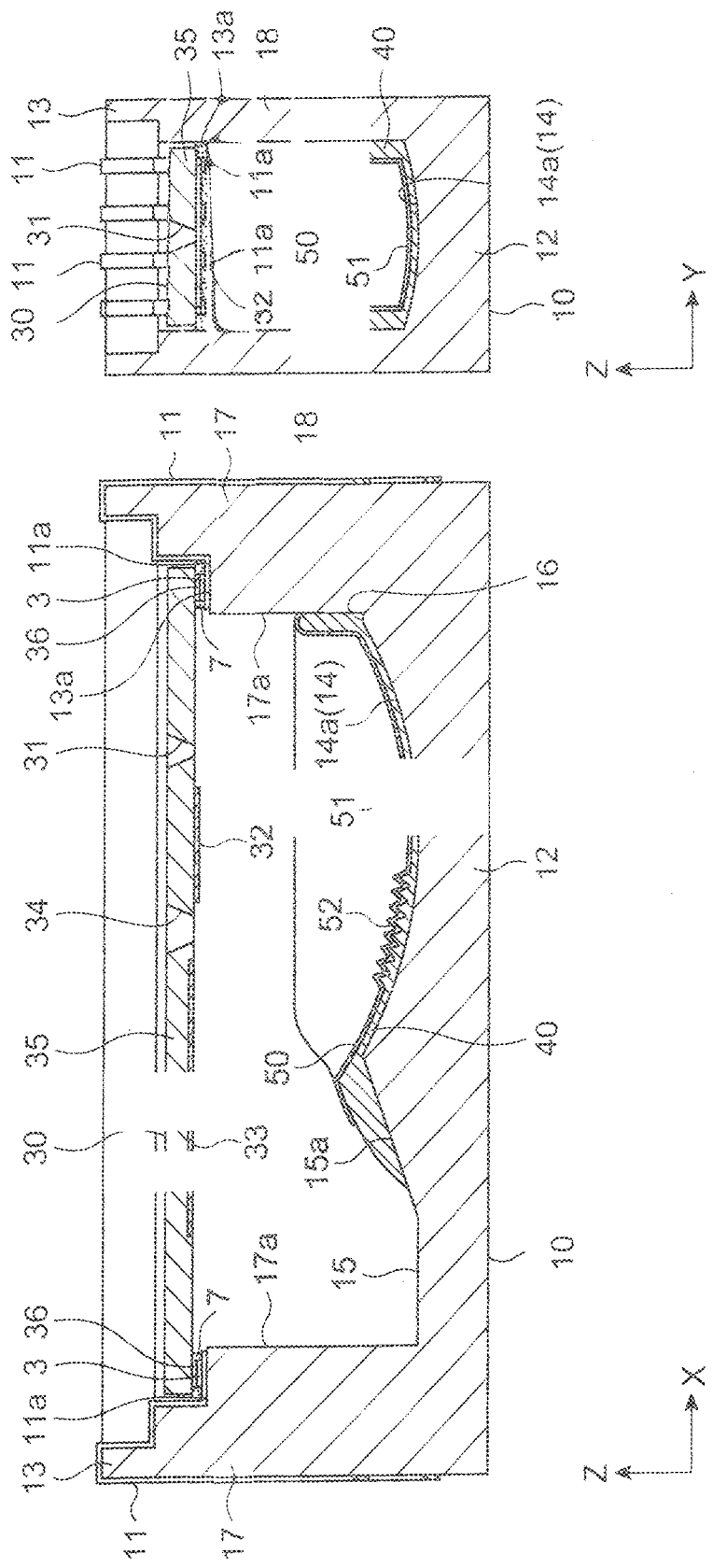
FIGS. 9A and 9B are cross-sectional views illustrating a process of the method for manufacturing the spectrometer of FIG. 1.

Subsequently, as illustrated in FIGS. 9A and 9B, the light detection element 30 is disposed in the first widened part 13*a* of the side wall part 13, and the terminal 36 of the light detection element 30 and the first end part 11*a* of the wiring 11 opposing each other in the first widened part 13*a* are connected to each other by the solder layer 3. That is, the light detection element 30 is attached to the side wall part 13 to oppose the depression 14, so that the side wall part 13 supports the light detection element 30 (fourth step). In this instance, self-alignment of the light detection element 30 is realized by melting/re-solidification of the solder layer 3 provided at each terminal 36. It is possible to realize self-alignment of the light detection element 30 by using a solder ball having a core for connection between the terminal 36 of the light detection element 30 and the first end part 11a of the wiring 11. Subsequently, for example, the reinforcing member 7 made of resin is disposed to cover the connection part between the terminal 36 of the light detection element 30 and the first end part 11a of the wiring 11 opposing each other between the light detection element 30 and the first widened part 13a.

Subsequently, as illustrated in FIGS. 10A and 10B, the cover 20 is disposed in the second widened part 13b of the side wall part 13, and the sealing member 4 made of, for example, resin, etc. is disposed between the cover 20 and the second widened part 13b. In this way, the space S is airtightly sealed, and the spectrometer 1 is obtained.

According to the method for manufacturing the spectrometer 1 described above, it is possible to easily manufacture the spectrometer 1 capable of inhibiting the resin layer 40 from being separated from the support 10 at the time of releasing the mold die 6, thereby attempting miniaturization while suppressing a decrease in detection accuracy.

Modified Example

Even though the embodiment of the disclosure has been described above, one aspect of the disclosure is not limited to the above embodiment.

Figures 11A, 11B:
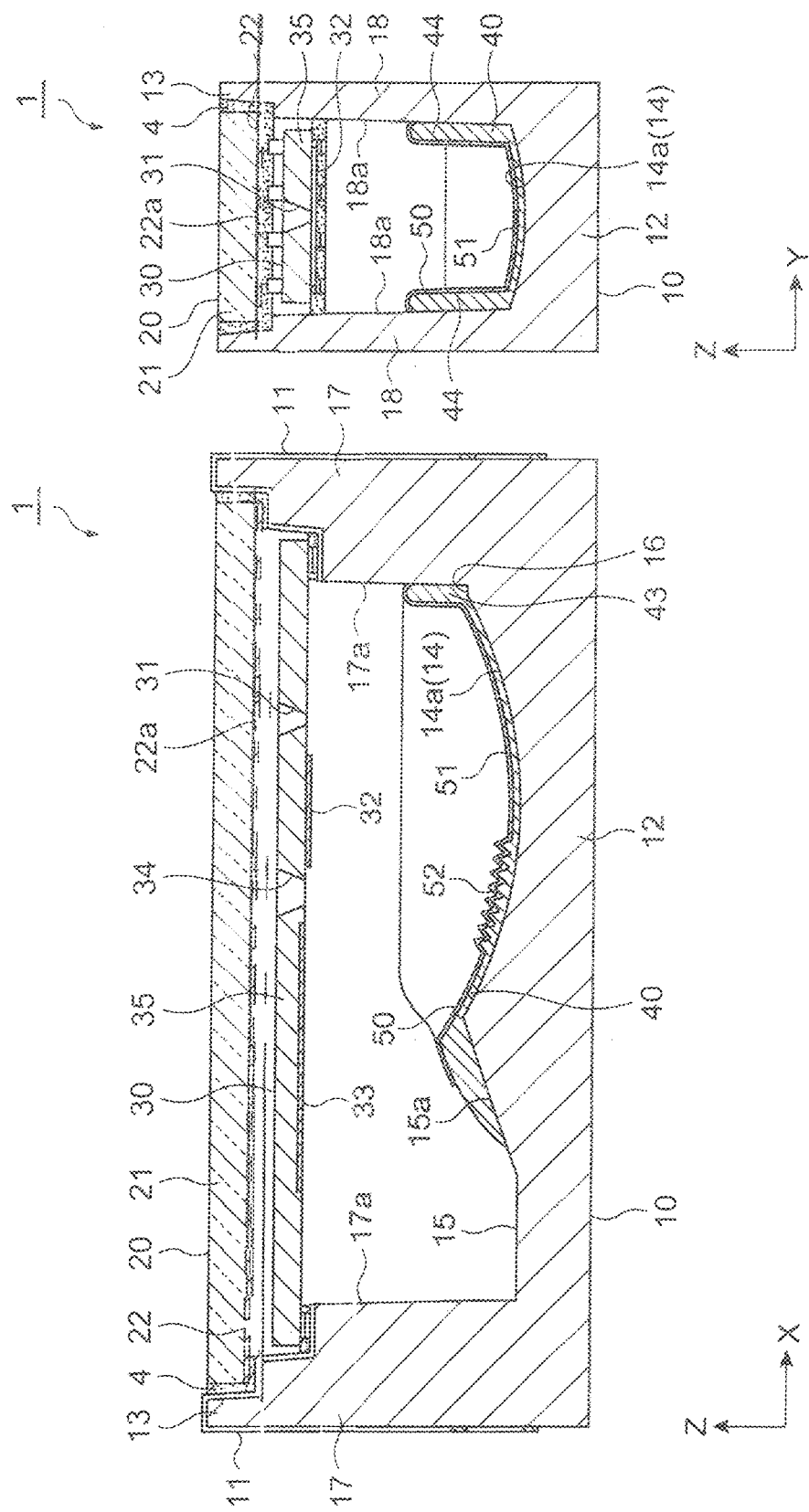
FIGS. 11A and 11B are cross-sectional views of a modified example of the spectrometer of FIG. 1.

For example, as illustrated in FIGS. 11A and 11B, the inner surfaces 17a of the pair of first side walls 17 opposing each other may be inclined to be separated from each other as the inner surfaces 17a are away from the depression 14 and the peripheral parts 15 and 16 and approach the light detection element 30. Similarly, the inner surfaces 18a of the pair of second side walls 18 opposing each other may be inclined to be separated from each other as the inner surfaces 18a are away from the depression 14 and the peripheral parts 15 and 16 and approach the light detection element 30. In this way, it is possible to inhibit stress from acting on the dispersive part 52 by relatively increasing the thickness of the side wall part 13 on the side of the depression 14 in which the dispersive part 52 is provided. In addition, it is possible to reduce the weight of the support 10 by relatively decreasing the thickness of the side wall part 13 on the light detection element 30 side. Further, the thickness of the resin layer 40 in the part in contact with the inner surface 17a of the first side wall 17 and the inner surface 18a of the second side wall 18 may be increased as the resin layer 40 is away from the depression 14 and the peripheral parts 15 and 16 and approaches the light detection element 30. When the thickness of the resin layer 40 in the part is made relatively small on the side of the depression 14 and the peripheral parts 15 and 16 and relatively large on the side of the light detection element 30, it is possible to inhibit the resin layer 40 from being separated from the support 10 while inhibiting stress from acting on the dispersive part 52. In addition, it is possible to easily release the mold die 6 at the time of manufacturing the spectrometer 1.

In addition, as illustrated in FIGS. 12A and 12B the cover 20 and the light detection element 30 may be joined to each other. In this case, the cover 20 and the light detection element 30 are mounted with respect to the support 10 as follows. In more detail, the cover 20 and the light detection element 30 are disposed in the first widened part 13a of the side wall part 13, and the terminal 36 of the light detection element 30 and the first end part 11a of the wiring 11 opposing each other in the first widened part 13a are connected to each other by the solder layer 3. Subsequently, the sealing member 4 made of resin is disposed between the cover 20 and the light detection element 30 and the first widened part 13a. In this way, when the cover 20 and the light detection element 30 are joined to each other in advance, it is possible to facilitate mounting of the cover 20 and the light detection element 30 with respect to the support 10. For example, the cover 20 and the light detection element 30 are prepared by being joined to each other in a state in which one of the cover 20 and the light detection element 30 is at a wafer level and then performing dicing.

In addition, for example, the terminal 36 of the light detection element 30 and the first end part 11a of the wiring 11 opposing each other may be connected to each other by a bump made of Au, solder, etc. or a conductive resin such as silver paste. In this case, for example, the reinforcing member 7 made of resin may be disposed to cover the connection part between the terminal 36 of the light detection element 30 and the first end part 11a of the wiring 11 opposing each other between the light detection element 30 and the first widened part 13a.

In addition, the light detection element 30 may be indirectly (for example, through another member such as a glass substrate, etc.) attached to the side wall part 13 as long as the light detection element 30 is supported by the side wall part 13.

In addition, the second end part 11b serving as the electrode pad for mounting the spectrometer 1 on the external circuit board may be disposed in a region other than the outer surface of the one second side wall 18 as long as the region corresponds to the outer surface of the support 10. In either case, the second end part 11b may be directly mounted on the surface of the external circuit board using a bump, solder, etc.

In addition, without the spectrometer 1 including the first reflection part 51 and the second reflection part 32, the light L1 passing through the light passing part 31 may be dispersed and reflected by the dispersive part 52, and the light L2 dispersed and reflected by the dispersive part 52 may be incident on the light detection part 33 and detected by the light detection part 33.

In addition, the inner surfaces 17a and 18a of the side wall part 13 may not correspond to flat surfaces and may correspond to curved surfaces, in addition, for example, the inner surface 14a of the depression 14 and the inner surfaces 17a and 18a of the side wall part 13 may be connected in a continuous state, for example, connected through an R-chamfered surface.

In addition, in the spectrometer 1, when a requirement "when viewed in the Z-axis direction, the area of the peripheral parts 15 and 16 adjacent to the depression 14 in the X-axis direction is larger than the area of the peripheral parts adjacent to the depression 14 in the Y-axis direction" is satisfied, the peripheral parts adjacent to the depression 14 in the Y-axis direction may be provided in the bottom wall part 12. In this case, the spectrometer 1 may be thinned in the Y-axis direction. The "area of the peripheral part located on the other first side wall 17 side with respect to the depression 14", the "area of the peripheral part located on the one second side wall 18 side with respect to the depression 14", and the "area of the peripheral part located on the other second side wall 18 side with respect to the depression 14" include the case of "0".

In addition, the inner surface 14a of the depression 14 may not be curved in a shape of a curved surface in each of the X-axis direction and the Y-axis direction and may be curved in a shape of a curved surface in one of the X-axis direction and the Y-axis direction.

Figure 13:
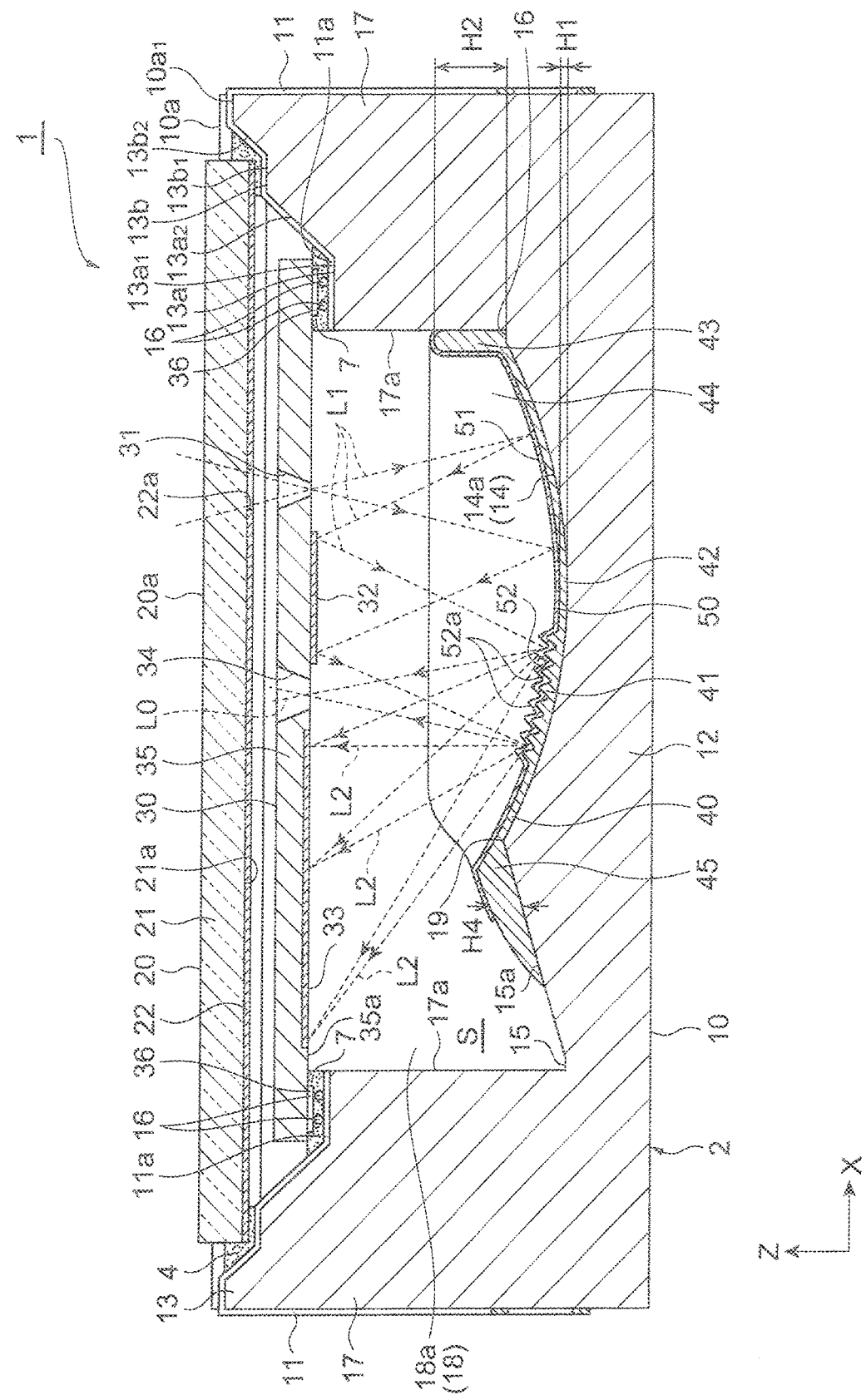
FIG. 13 is a cross-sectional view of a modified example of the spectrometer of FIG. 1.

In addition, as illustrated in FIG. 13, in the first widened part (first stepped part) 13a in which the light detection element 30 is disposed, a side surface 13a₂ of the first widened part 13a may be inclined to form an obtuse angle with a bottom surface 13a₁ of the first widened part 13a. In addition, in the second widened part (second stepped part) 13b in which the cover 20 is disposed, a side surface 13b₂ of the second widened part 13b may be inclined to form an obtuse angle with a bottom surface 13b₁ of the second widened part 13b. In this way, it is possible to easily and accurately draw the wiring 11. In addition, it is possible to reduce stress generated in the wiring 11.

In addition, the reinforcing member 7 made of resin may be filled between the side surface 13a₂ of the first widened part 13a and the light detection element 30. In this way, since the reinforcing member 7 easily enters a gap when the side surface 13a₂ is inclined, it is possible to more sufficiently reinforce support of the light detection element 30 and to more sufficiently ensure airtightness in the part. In addition, a shift in position of the light detection element 30 in the X-axis direction (the second direction in which the plurality of grating grooves 52a included in the dispersive part 52 is aligned) may be more reliably suppressed by a synergistic effect with arrangement of a bump 16 to be described later. In addition, the sealing member 4 made of resin may be filled between the side surface 13b₂ of the second widened part 13b and the cover 20. In this way, since the sealing member 4 easily enters a gap when the side surface 13b₂ is inclined, it is possible to more sufficiently reinforce support of the cover 20 and to more sufficiently ensure airtightness in the part. The airtightness may be ensured by filling the reinforcing member 7 made of resin between the side surface 13a₂ of the first widened part 13a and the light detection element 30, by filling the sealing member 4 made of resin between the side surface 1362 of the second widened part 13b and the cover 20, or by filling the reinforcing member 7 between the side surface 13a₂ and the light detection element 30 and filling the sealing member 4 between the side surface 13b₂ and the cover 20. The airtightness may be ensured by a configuration (the spectrometer 1 is accommodated in another package and the inside of the package is airtightly sealed) other than these configurations related to the airtightness.

In addition, as illustrated in FIG. 13, a region 10a₁ in which at least the wiring 11 is disposed on an end surface 10a on the opposite side from the bottom wall part 12 in the support 10 may be located on the bottom wall part 12 side with respect to a surface 20a on the opposite side from the bottom wall part 12 in the cover 20. In this way, it is possible to prevent the wiring 11 from coming into contact with another member at the time of mounting the spectrometer 1. In addition, it is possible to reduce the length of the wiring 11. The whole end surface 10a of the support 10 may be located on the bottom wall part 12 side with respect to the surface 20a of the cover 20.

In addition, as illustrated in FIG. 13, the cover 20 and the light detection element 30 may be spaced apart from each other. In this way, stray light may be confined in a space between the cover 20 and the light detection element 30, and the stray light may be more reliably removed.

In addition, a coefficient of thermal expansion of the support 10 in the X-axis direction (the second direction in which the plurality of grating grooves 52a included in the dispersive part 52 is aligned) is less than or equal to a coefficient of thermal expansion of the support 10 in the Y-axis direction (a third direction orthogonal to the first direction in which the depression 14 and the light detection element 30 oppose each other and orthogonal to the second direction) (more preferably, the coefficient of thermal expansion of the support 10 in the X-axis direction is smaller than the coefficient of thermal expansion of the support 10 in the Y-axis direction). That is, when the coefficient of thermal expansion of the support 10 in the X-axis direction is set to α, and the coefficient of thermal expansion of the support 10 in the Y-axis direction is set to β, a relationship of α≤β is satisfied (more preferably, a relationship of α<β is satisfied). In this way, it is possible to inhibit a positional relationship between the plurality of grating grooves 52a in the dispersive part 52 and the plurality of light detection channels in the light detection part 33 of the light detection element 30 from varying due to thermal expansion of the support 10.

In addition, as illustrated in FIG. 13, for example, one terminal 36 of the light detection element 30 and one first end part 11a of the wiring 11 opposing each other may be connected to each other by a plurality of bumps 61 made of Au, solder, etc., and the plurality of bumps 61 may be aligned along the X-axis direction (the second direction in which the plurality of grating grooves 52a included in the dispersive part 52 is aligned). Further, a plurality of sets of such one terminal 36, one first end part 11a, and a plurality of bumps 61 may be provided in the Y-axis direction. In this way, for example, it is possible to inhibit a positional relationship between the plurality of grating grooves 52a in the dispersive part 52 and the plurality of light detection channels in the light detection part 33 of the light detection element 30 from varying due to thermal expansion of the support 10. In addition, it is possible to sufficiently ensure the area of each terminal 36 by two-dimensionally disposing the bumps 61 when compared to a case in which the bumps 61 are disposed in one row since there is room in available space.

In addition, the first widened part 13a may correspond to a stepped part in which the space S (the space in which the optical path of the light L1 from the light passing part 31 to the dispersive part 52, the optical path of the light L2 from the dispersive part 52 to the light detection part 33, and the optical path of the zero-order light L0 from the dispersive part 52 to the zero-order light capture part 34 are formed) is widened at least in one direction (for example, the X-axis direction) on the opposite side from the bottom wall part 12. The first widened part 13a may include one step or a plurality of steps. Similarly, the second widened part 13b may correspond to a stepped part in which the first widened part 13a is widened at least in one direction (for example, the X-axis direction) on the opposite side from the bottom wall part 12. The second widened part 13b may include one step or a plurality of steps. In a case in which the light detection part 33 is configured as a back surface-incident photodiode, and the plurality of terminals 36 is provided on the surface of the substrate 35 on the opposite side from the surface 35a, when each terminal 36 is electrically connected to the first end part 11a of the corresponding wiring 11 by wire bonding, the first end part 11a of each wiring 11 may be disposed in a different step (a step on the outer and upper side of a step in which the light detection element 30 is disposed) from the step in which the light detection element 30 is disposed in the first widened part 13a including the plurality of steps.

In addition, the material of the support 10 is not limited to ceramic, and may correspond to another molding material such as a resin, for example, LCP, PPA, epoxy, etc. or molding glass. Further, the shape of the support 10 is not limited to the shape of the rectangular parallelepiped, and may correspond to, for example, a shape in which a curved surface is provided on the outer surface. Furthermore, the shape of the side wall part 13 is not limited to the rectangular annular shape as long as the shape corresponds to an annular shape that encloses the depression 14 when viewed in the Z-axis direction, and may correspond to a circular annular shape. In this way, a material and a shape of each component of the spectrometer 1 are not limited to the above-described material and shape, and it is possible to apply various materials and shapes.

REFERENCE SIGNS LIST

1 . . . spectrometer, 10 . . . support, 12 . . . bottom wall part, 13 . . . side wall part, 14 depression, 14a . . . inner surface, 15, 16 . . . peripheral part, 15a . . . inclined surface, 17 . . . first side wall, 17a . . . inner surface, 18 . . . second side wall, 18a . . . inner surface, 19 . . . boundary line, 30 . . . light detection element, 31 . . . light passing part. 32 . . . second reflection part, 33 . . . light detection part, 51 . . . first reflection part. 52 . . . dispersive part, 52a . . . grating groove.

The invention claimed is:

1. A spectrometer comprising:
a cover including a light passing part;
a dispersive part;
a light detection element;
a support accommodating the dispersive part and the light detection element, and in which a dispersive space is formed; and
a wiring electrically connected to the light detection element,
wherein the support includes a bottom wall part and a side wall part including an opening opposing the bottom wall part,
the cover is fixed to the opening,
the cover is enclosed by an end surface of the side wall part on the opposite side from the bottom wall part, when viewed in a first direction in which the bottom wall part and the opening opposes each other, and
a portion of wiring disposed on the end surface.

2. The spectrometer according to claim 1, wherein a side surface of the cover opposes an inner surface of the side wall part.

3. The spectrometer according to claim 1, wherein the cover is accommodated inside the opening.

4. The spectrometer according to claim 1, wherein the light passing part is a slit.

5. The spectrometer according to claim 4, wherein the slit extends along a direction intersecting a longitudinal direction of the support when viewed in the first direction.

6. The spectrometer according to claim 1, wherein the portion of the wiring extends so as to traverse the end surface.

7. The spectrometer according to claim 1, wherein the wring extends to an outer surface of the side wall part.

8. The spectrometer according to claim 1, wherein the side wall part includes a pair of first side walls opposing each other in a second direction orthogonal to the first direction, and a pair of second side walls opposing each other in a third direction orthogonal to both the first direction and the second direction.

9. The spectrometer according to claim 8, wherein the length of the support in each of the first direction, the second direction and the third direction is less than or equal to 15 mm.

10. The spectrometer according to claim 9, wherein the length of the support in the second direction or the third direction is less than 10 mm.

11. The spectrometer according to claim 8, wherein a thickness of each of the pair of first side walls is larger than a thickness of each of the pair of second side walls.

12. The spectrometer according to claim 8, wherein the side wall part has an annular shape enclosing the dispersive part when viewed in the first direction.

13. The spectrometer according to claim 8, wherein a coefficient of thermal expansion of the support in the second direction is smaller than a coefficient of thermal expansion of the support in the third direction.

14. The spectrometer according to claim 8, wherein the light detection element is disposed in a first widened part in which a space inside the support is widened on an opposite side from the bottom wall part in the side wall part, and
the first widened part is provided with an end part of the wiring.

15. The spectrometer according to claim 14, wherein one terminal of the light detection element and the one end part of the wiring opposing each other in the first widened part are connected to each other by a plurality of bumps, and
the plurality of bumps is aligned along the second direction.

16. The spectrometer according to claim 14, wherein a member made of resin is filled between the side surface of the first widened part and the light detection element.

17. The spectrometer according to claim 14, wherein the cover is disposed in a second widened part in which a space inside the first widened part is widened on the opposite side from the bottom wall part in the side wall part.

18. The spectrometer according to claim 17, wherein the cover and the light detection element are away from each other.

19. The spectrometer according to claim 17 wherein a member made of resin is filled between the side surface of the second widened part and the cover.

20. The spectrometer according to claim 8, wherein the length of the support in the second direction is larger than the length of the support in the first direction.

21. The spectrometer according to claim 8, wherein the light detection element is indirectly attached to the side wall part through the cover.

22. The spectrometer according to claim 11, wherein a coefficient of thermal expansion of the support in the second direction is smaller than a coefficient of thermal expansion of the support in the third direction.

23. The spectrometer according to claim 15, wherein a member made of resin is filled between the side surface of the first widened part and the light detection element.

24. The spectrometer according to claim 18, wherein a member made of resin is filled between the side surface of the second widened part and the cover.

25. The spectrometer according to claim 8, wherein a concave curved surface is provided on a surface of the bottom wall part on the cover side.

26. The spectrometer according to claim 25, wherein an optical function part is provided on the concave curved surface.

27. The spectrometer according to claim 25, wherein a plurality of optical function parts is provided on the concave curved surface.

28. The spectrometer according to claim 8, wherein the light detection element is provided on a semiconductor substrate, and
the semiconductor substrate is smaller than the cover when viewed in the first direction.

29. The spectrometer according to claim 26, wherein the optical function part is offset so as to be disposed on a one side in the second direction with respect to the center of the concave curved surface when viewed in the first direction.

30. The spectrometer according to claim 8, wherein an incident light diffuses at the light passing part, and
the light dispersed by the dispersive part converges at the same height as the light passing part in the first direction.

* * * * *